US011870715B2

(12) United States Patent
Sakhnini et al.

(10) Patent No.: US 11,870,715 B2
(45) Date of Patent: Jan. 9, 2024

(54) DYNAMIC HYBRID UW AND CP BASED SYMBOL FORMATS

(71) Applicant: QUALCOMM Incorporated, San Diego, CA (US)

(72) Inventors: Iyab Issam Sakhnini, San Diego, CA (US); Tao Luo, San Diego, CA (US); Hemant Saggar, Irvine, CA (US); Xiaoxia Zhang, San Diego, CA (US); Jun Ma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 74 days.

(21) Appl. No.: 17/649,041

(22) Filed: Feb. 7, 2022

(65) Prior Publication Data

US 2023/0254077 A1   Aug. 10, 2023

(51) Int. Cl.
*H04L 5/00* (2006.01)
*H04L 27/26* (2006.01)

(52) U.S. Cl.
CPC ........ *H04L 5/0044* (2013.01); *H04L 27/2607* (2013.01); *H04L 27/2636* (2013.01)

(58) Field of Classification Search
None
See application file for complete search history.

(56) References Cited

U.S. PATENT DOCUMENTS

2018/0367355 A1 * 12/2018 Pan ............... H04L 27/2607

FOREIGN PATENT DOCUMENTS

WO   WO-2018085561 A1 *   5/2018 ......... H04L 27/2607

* cited by examiner

*Primary Examiner* — Diane L Lo
(74) *Attorney, Agent, or Firm* — Procopio, Cory, Hargreaves & Savitch LLP

(57) ABSTRACT

A wireless device (e.g., a UE or a base station) may generate a hybrid symbol including a CP portion, a data portion, and at least one of a header portion or a tail portion. The CP portion may be located at a beginning of the hybrid symbol, and may include one or more CP samples that correspond to a predefined number of samples at an end of the hybrid symbol. The data portion may be located after the header portion or before the tail portion. The header portion may be located after the CP portion, and may include one or more predefined header samples. The tail portion may be located at the end of the hybrid symbol, and may include one or more predefined tail samples. The wireless device may generate a waveform including the generated hybrid symbol. The wireless device may transmit a signal based on the generated waveform.

29 Claims, 15 Drawing Sheets

1200

1202
generate a hybrid symbol comprising a CP portion, a data portion, and at least one of a header portion or a tail portion, the CP portion being located at a beginning of the hybrid symbol and comprising one or more CP samples that correspond to a predefined number of samples at an end of the hybrid symbol, the data portion being located after the header portion or before the tail portion, the header portion being located after the CP portion and comprising one or more predefined header samples, and the tail portion being located at the end of the hybrid symbol and comprising one or more predefined tail samples 1204
generate a waveform including the generated hybrid symbol 1206
transmit a signal based on the generated waveform

DYNAMIC HYBRID UW AND CP BASED SYMBOL FORMATS

TECHNICAL FIELD

The present disclosure relates generally to communication systems, and more particularly, to generation of a hybrid symbol including both a cyclic prefix (CP) and a guard interval (GI) in a wireless communication system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The apparatus may generate a hybrid symbol including a CP portion, a data portion, and at least one of a header portion or a tail portion. The CP portion may be located at a beginning of the hybrid symbol, and may include one or more CP samples that correspond to a predefined number of samples at an end of the hybrid symbol. The data portion may be located after the header portion or before the tail portion. The header portion may be located after the CP portion, and may include one or more predefined header samples. The tail portion may be located at the end of the hybrid symbol, and may include one or more predefined tail samples. The apparatus may generate a waveform including the generated hybrid symbol. The apparatus may transmit a signal based on the generated waveform.

In an aspect of the disclosure, a method, a computer-readable medium, and an apparatus are provided. The apparatus may be a base station. The apparatus may generate a hybrid symbol including a CP portion, a data portion, and at least one of a header portion or a tail portion. The CP portion may be located at a beginning of the hybrid symbol, and may include one or more CP samples that correspond to a predefined number of samples at an end of the hybrid symbol. The data portion may be located after the header portion or before the tail portion. The header portion may be located after the CP portion, and may include one or more predefined header samples. The tail portion may be located at the end of the hybrid symbol, and may include one or more predefined tail samples. The apparatus may generate a waveform including the generated hybrid symbol. The apparatus may transmit a signal based on the generated waveform.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
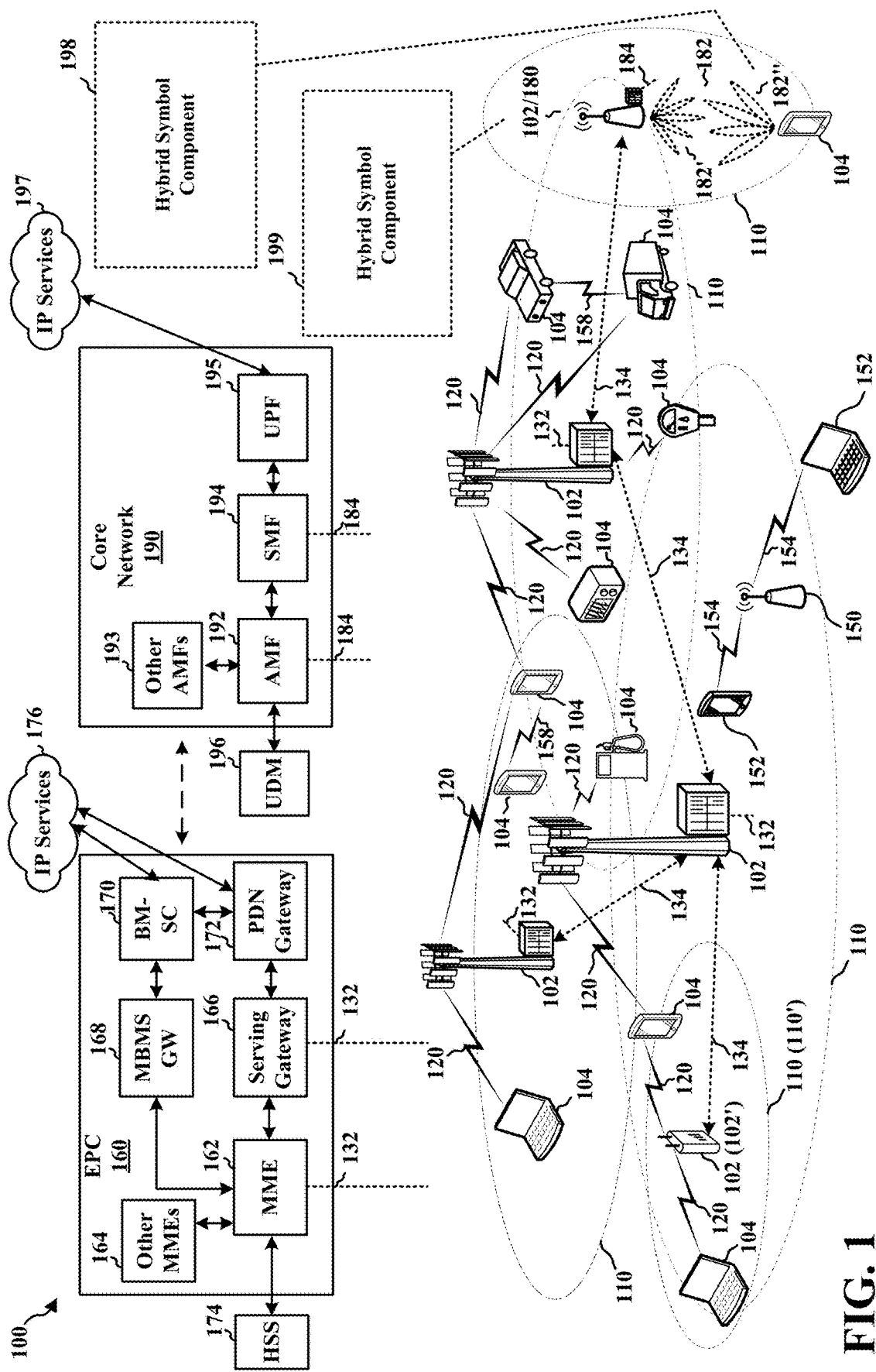
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN)

sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a hybrid symbol component 198 that may be configured to generate a hybrid symbol including a CP portion, a data portion, and at least one of a header portion or a tail portion. The CP portion may be located at a beginning of the hybrid symbol, and may include one or more CP samples that correspond to a predefined number of samples at an end of the hybrid symbol. The data portion may be located after the header portion or before the tail portion. The header portion may be located after the CP portion, and may include one or more predefined header samples. The tail portion may be located at the end of the hybrid symbol, and may include one or more predefined tail samples. The hybrid symbol component 198 may be configured to generate a waveform including the generated hybrid symbol. The hybrid symbol component 198 may be configured to transmit a signal based on the generated waveform. In certain aspects, the base station 180 may include a hybrid symbol component 199 that may be configured to generate a hybrid symbol including a CP portion, a data portion, and at least one of a header portion or a tail portion. The CP portion may be located at a beginning of the hybrid symbol, and may include one or more CP samples that correspond to a predefined number of samples at an end of the hybrid symbol. The data portion may be located after the header portion or before the tail portion. The header portion may be located after the CP portion, and may include one or more predefined header samples. The tail portion may be located at the end of the hybrid symbol, and may include one or more predefined tail samples. The hybrid symbol component 199 may be configured to generate a waveform including the generated hybrid symbol. The hybrid symbol component 199 may be configured to transmit a signal based on the generated waveform. Although the following description may be focused on 5G NR, the concepts described herein may be applicable to other similar areas, such as LTE, LTE-A, CDMA, GSM, and other wireless technologies.

Figure 2:
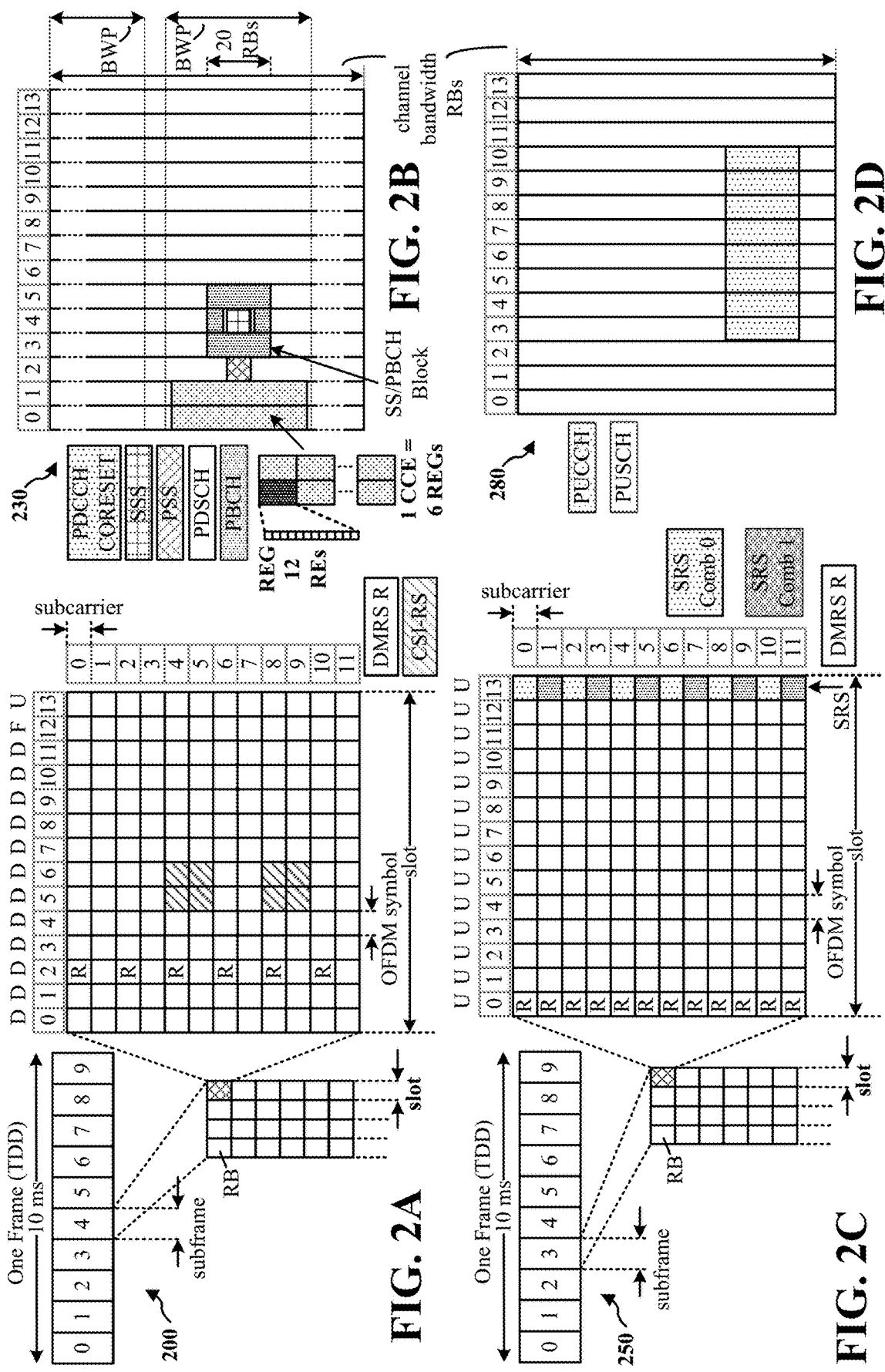
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK)

feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
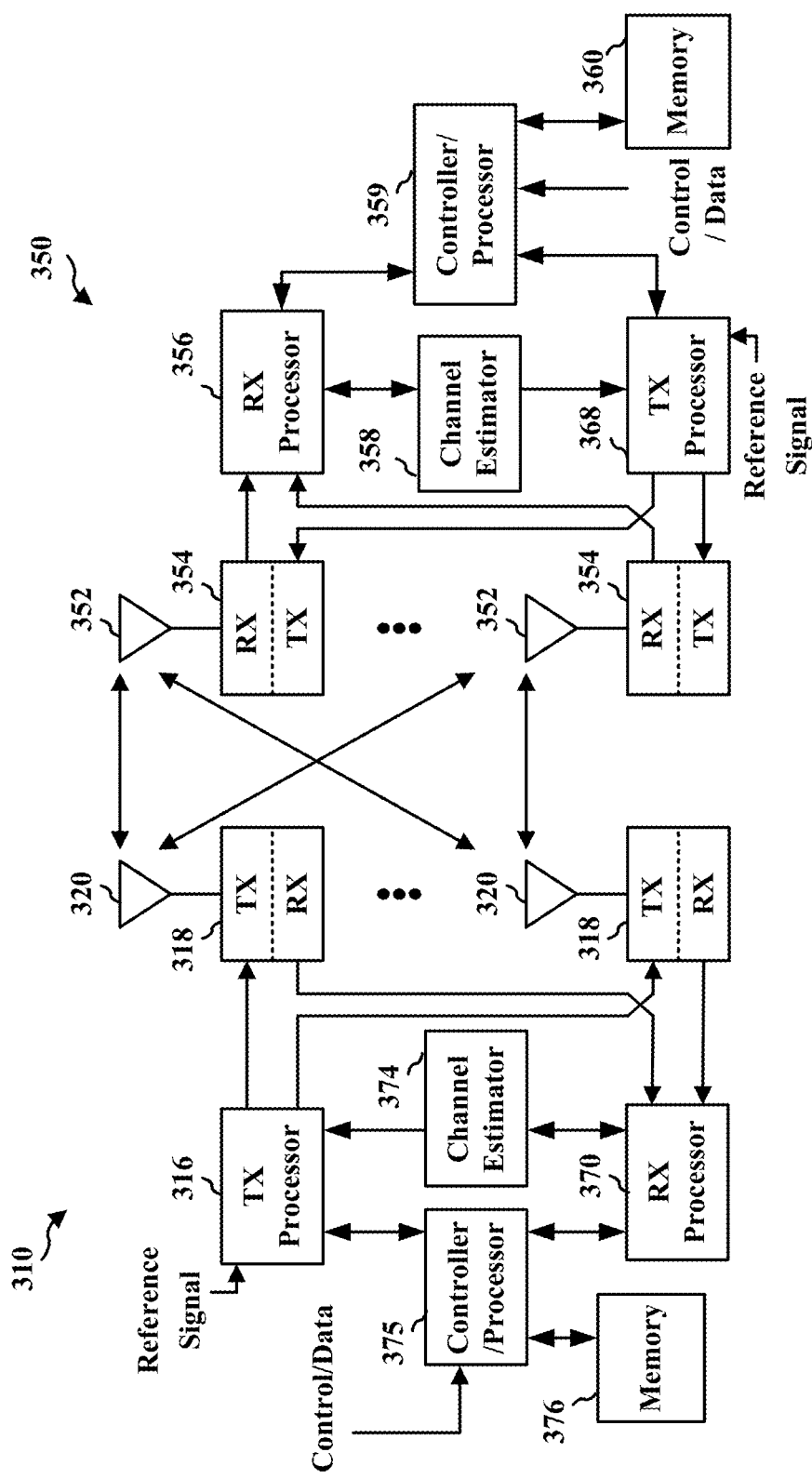
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Larger bandwidths may be available in higher NR operating bands. In general, several considerations may apply when the higher bands are used. For example, the higher bands may be associated with higher phase noise (PN). A lower peak to average power ratio (PAPR) may be desirable when the higher bands are used. Further, the UE implementation complexity may increase when the higher bands are used. Several waveforms may be used for the uplink or the downlink in the higher bands. The waveforms may include the CP-OFDM waveform, the frequency division (FD) implementation of a single carrier waveform (e.g., the DFT-s-OFDM waveform), or the time division (TD) implementation of a single carrier (SC) waveform (e.g., the SC-quadrature amplitude modulation (QAM) (SC-QAM) waveform). Each of these waveforms may be associated with its respective advantages and disadvantages.

The CP-OFDM waveform may be a CP based waveform. The single tap frequency domain equalization (FDE) may be used with the CP-OFDM waveform. Advantages of the CP-OFDM waveform may include, for example, efficient bandwidth utilization, easier implementation of frequency domain multiplexing (FDM) compared with other waveforms, the support for increased SCSs, or the support for higher order MIMO. On the other hand, disadvantages of the CP-OFDM waveform may include, for example, higher implementation complexity compared with other waveforms, a higher PAPR compared with other waveforms, or susceptibility to the PN.

Further, the DFT-s-OFDM waveform may be a CP or GI based waveform. The single tap FDE may be used with the DFT-s-OFDM waveform. Advantages of the DFT-s-OFDM waveform may include, for example, efficient bandwidth utilization, the support for FDM, or the support for increased SCSs. On the other hand, disadvantages of the DFT-s-OFDM waveform may include, for example, higher implementation complexity compared with other waveforms due to the inclusion of the DFT operation or an increased PAPR when FDM is utilized.

Furthermore, the SC-QAM waveform may be a CP or GI based waveform. The single tap FDE or time domain equalization (TDE) may be used with the SC-QAM waveform. Guard bands may be implemented with the SC-QAM waveform. Advantages of the SC-QAM waveform may include, for example, lower implementation complexity compared with other waveforms, the support for FDM with the use of guard bands, a lower PAPR due to the time domain filtering, or better PN handling compared with other waveforms. Accordingly, the SC-QAM waveform may be more suitable for scenarios with lower signal to noise ratios (SNRs). On the other hand, disadvantages of the SC-QAM waveform may include, for example, difficulty associated with implementing MIMO.

In one or more configurations, the waveform used may be configured (e.g., semi-statically), and may be changed when a different waveform is more suitable.

Figure 4:
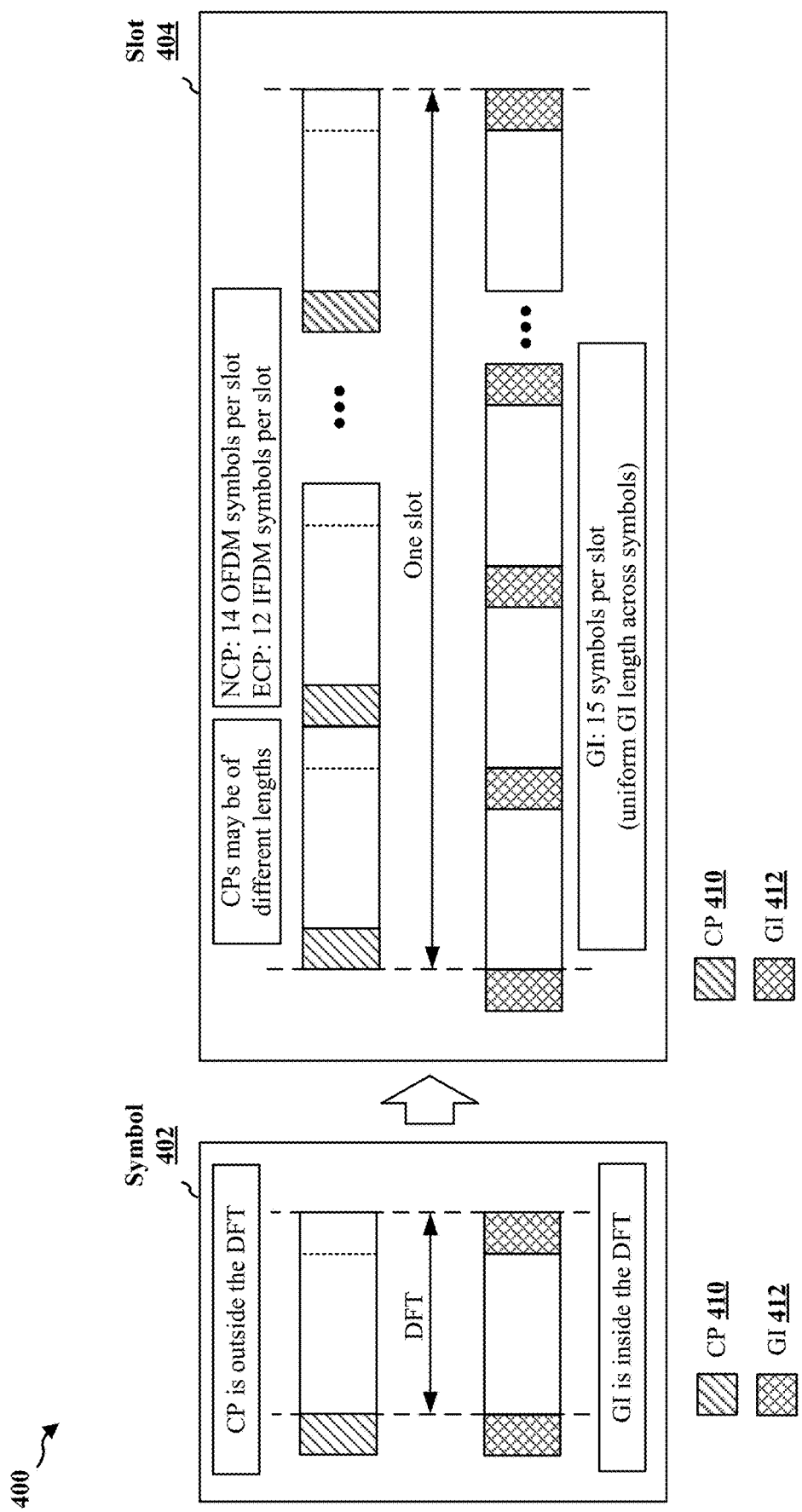
FIG. 4 is a diagram illustrating the CP and the GI that may be utilized in various waveforms.

FIG. 4 is a diagram 400 illustrating the CP and the GI that may be utilized in various waveforms. There may be multiple objectives associated with utilizing the CP 410 or the GI 412. For example, use of the CP 410 or the GI 412 may convert the linear convolution of the TX symbols with the channel to a circular convolution. Accordingly, the simple one tap FDE may be applied to the waveform at the RX. Use of the CP 410 or the GI 412 may also help to reduce or avoid inter-symbol interference. Moreover, the CP 410 or the GI 412 may help to maintain symbol 402 or slot 404 alignment. As shown in FIG. 4, in one or more examples, the CP 410 may be outside the DFT area of a symbol 402, whereas the GI 412 may be inside the DFT area of a symbol 402. Further, CPs 410 may be of various different lengths. For example, each slot 404 may include 14 OFDM symbols 402 if the normal CP (NCP) is used, or may include 12 OFDM symbols 402 if the extended CP (ECP) is used. As for the GI 412, in one or more examples, a uniform GI 412 length may be used across the symbols 402 in a slot 404. For example, each slot 404 may include 15 OFDM symbols 402 if the GI 412 is used.

There may be several differences between the CP 410 and the GI 412. For example, the CP 410 may be slot contained (i.e., a CP 410 associated with a symbol 402 within a slot 404 may not extend into a different slot), whereas the GI 412 may not be slot contained (i.e., a GI 412 associated with a last symbol in a previous slot may be used for the current slot). Further, the CP 410, which may be appended to the beginning of a symbol 402 and may include a copy of samples located at the end of the same symbol 402, may contain random or indeterminate data. Accordingly, the CP 410 may not be used for purposes such as synchronization, channel estimation, or phase estimation or tracking. Therefore, the CP 410 may represent purely an overhead. In contrast, the GI 412 may contain known data or a known sequence (e.g., all 0's or a unique word (UW)). Therefore, the GI 412 may be used for synchronization, channel estimation, or phase estimation or tracking. Moreover, the CP 410 may not be easily adaptable to different delay spreads, whereas because the GI 412 is within the DFT area, the GI 412 length may be changed to accommodate different delay spreads.

Multiple ways may be utilized to implement a GI 412. For example, with a zero tail (ZT) approach, samples including zeroes (0's) may be appended to the end of the symbols. If samples including zeroes are appended to the beginning of the symbols, the approach may be referred to as a zero header (ZH) approach. As for the UW approach, a known signal or sequence may be appended to the beginning or the end of the modulation symbols.

Figure 5:
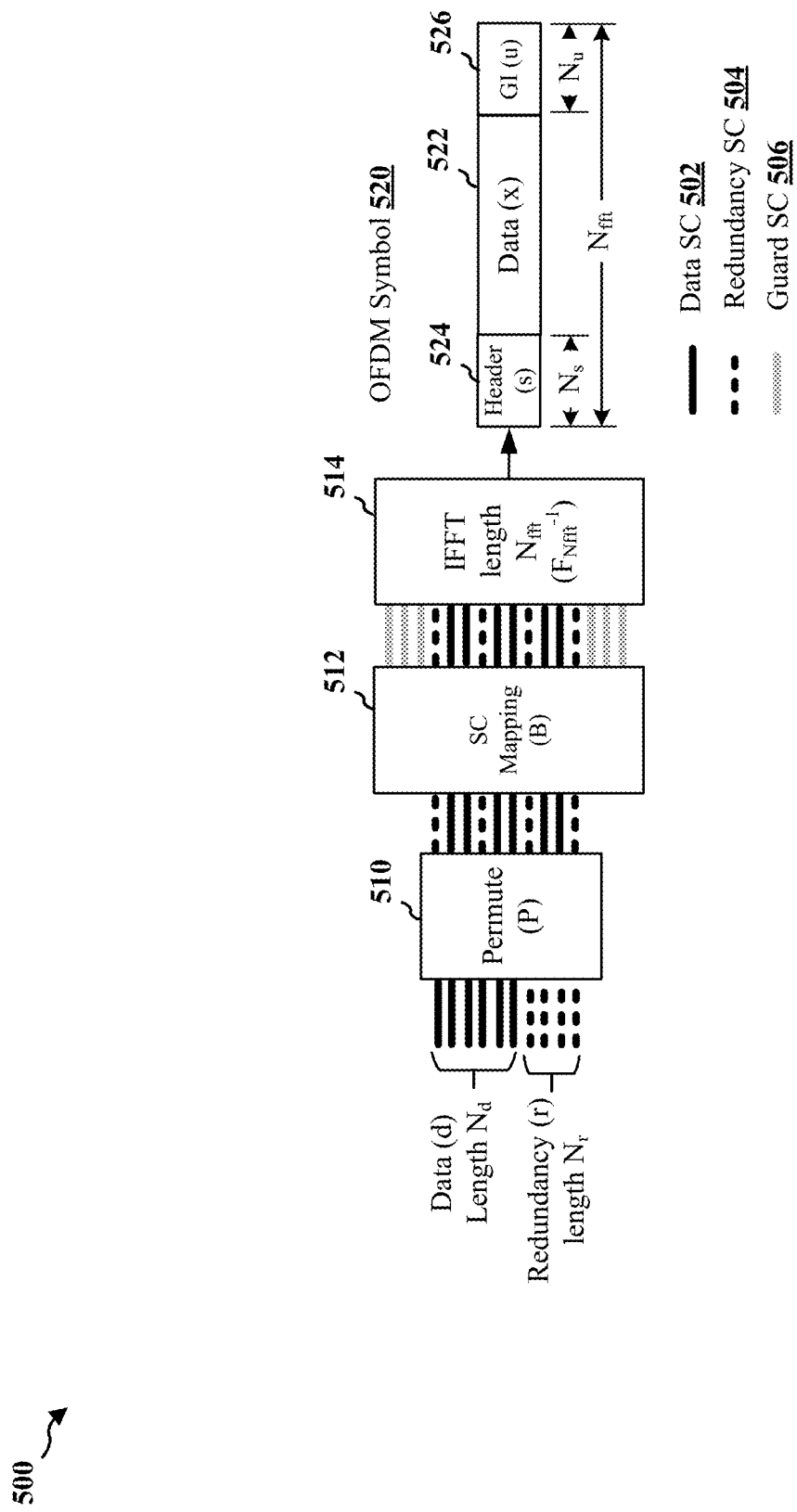
FIG. 5 is a diagram illustrating a process of generating a GI based OFDM symbol using a systematic approach.

FIG. 5 is a diagram 500 illustrating a process of generating a GI based OFDM symbol using a systematic approach. Redundant subcarriers (r) 504 may be inserted before the IFFT 514 input, where (r) 504 may be dependent on the data subcarriers (d) 502 and/or the guard subcarriers (u) 506. The guard subcarriers (u) 506 may also be referred to as GI subcarriers.

At the subcarrier mapping block 512, which may correspond to a B subcarrier mapping matrix, (d) 502 and (r) 504 may be mapped to different REs (each RE may correspond to one symbol by one subcarrier/tone) in an RB for IFFT 514 input. Mapping (r) 504 into the IFFT 514 input may be important because unoptimized locations or mapping of (r) 504 at the subcarrier mapping block 512 may yield a high energy at the IFFT 514 output, which may be associated with unrealistically high power specifications at the power amplifier. To optimize the locations or mapping of (r) 504, at a permutation block 510, which may correspond to a P permutation matrix, the column order associated with (d) 502 and (r) 504 may be changed. Accordingly, the permutation block 510 may be used to manage or control the possible energy increase at the IFFT 514 output. At the IFFT block 514, an IFFT operation may be performed on the (d) 502, (r) 504, and (u) 506 as the IFFT 514 input. The output of the IFFT block 514 may be the GI-OFDM symbol 520 of the length Nfft in the time domain. The GI-OFDM symbol 520 may include a data portion (x) 522, a header portion (s) 524, and a GI portion (u) 526. In particular, the header portion (s) 524 may be of the length Ns, and the GI portion (u) 526 of the GI-OFDM symbol 520 may be of the length N.

The process of FIG. 5 may be represented by the model $$\begin{bmatrix} s \\ x \\ u \end{bmatrix} = M \begin{bmatrix} d \\ r \end{bmatrix}, \text{ where } M = \begin{bmatrix} M_{11} & M_{12} \\ M_{21} & M_{22} \\ M_{31} & M_{32} \end{bmatrix} = F_N^{-1} BP,$$

s may be the header portion (s) 524 of the OFDM symbol 520, x may be the data portion (x) 522 of the OFDM symbol 520, u may be the GI portion (u) 526 of the OFDM symbol 520, $F_N^{-1}$ may correspond to an IFFT process of a length N, B may be the B subcarrier mapping matrix, P may be the P permutation matrix, d may be (d) 502, and r may be (r) 504. Therefore, $$\begin{bmatrix} s \\ x \\ u \end{bmatrix} = \begin{bmatrix} M_{11} & M_{12} \\ M_{21} & M_{22} \\ M_{31} & M_{32} \end{bmatrix} \begin{bmatrix} d \\ r \end{bmatrix}.$$

Accordingly, $$\begin{bmatrix} s \\ u \end{bmatrix} = \begin{bmatrix} M_{11} & M_{12} \\ M_{31} & M_{32} \end{bmatrix} \begin{bmatrix} d \\ r \end{bmatrix}.$$

To find an estimate of (r) 504, in one or more examples, given desired (u 526, an estimate of (r) 504, $\hat{r}$ may be calculated based on the formula $$\hat{r} = \begin{bmatrix} M_{12} \\ M_{32} \end{bmatrix}^{+} \left( \begin{bmatrix} s \\ u \end{bmatrix} - \begin{bmatrix} M_{11} \\ M_{31} \end{bmatrix} d \right),$$

where $(.)^{+}$ is the pseudo-inverse. Further, other ways for obtaining $\hat{r}$ may also be utilized. Examples may include QR decomposition/factorization, singular value decomposition (SVD), etc.

Figure 6:
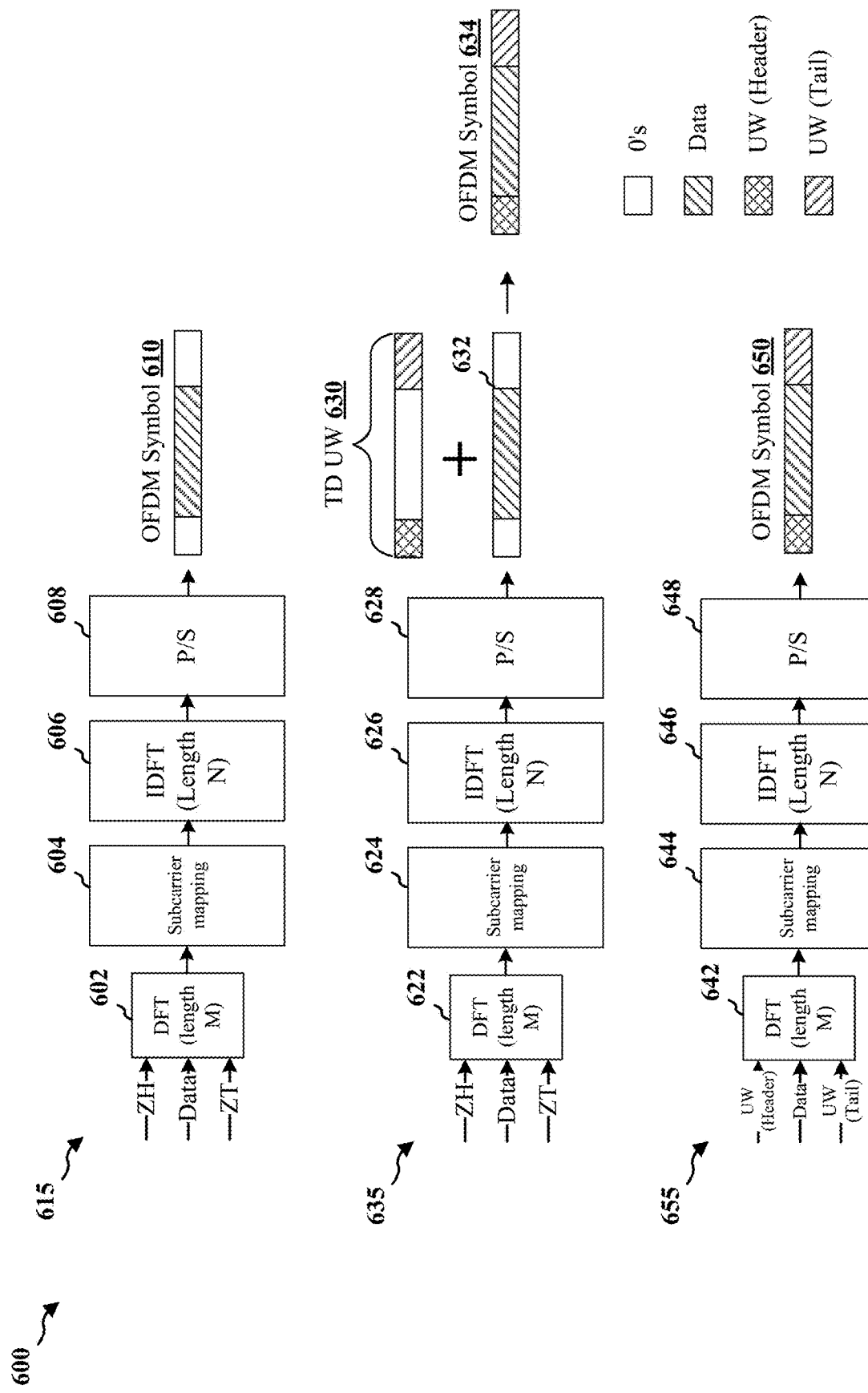
FIG. 6 is a diagram illustrating various processes associated with generating a DFT-s-OFDM symbol.

FIG. 6 is a diagram 600 illustrating various processes associated with generating a DFT-s-OFDM symbol. In one configuration, at 615, an OFDM symbol including a ZH portion, a data portion, and a ZT portion may be generated. In particular, the ZH, the data, and the ZT may be inputted into a DFT block 602. The output of the DFT block may be inputted into a subcarrier mapping block 604. At the subcarrier mapping block 604, the ZH, data, and ZT subcarriers may be mapped to different REs in an RB for inverse DFT (IDFT) 614 input. The IDFT process performed at the IDFT block 606 may be associated with a length N. The output of the IDFT block 606 may be inputted into a parallel-to-serial (P/S) block 608. The P/S block 608 may output an OFDM symbol 610 including a ZH portion, a data portion, and a ZT portion.

In another configuration, at 635, an OFDM symbol including a UW header portion, a data portion, and a UW tail portion may be generated. In particular, the ZH, the data, and the ZT may be inputted into a DFT block 622. The DFT block 622, the subcarrier mapping block 624, the IDFT block 626, and the P/S block 628 may correspond to and be similar to the DFT block 602, the subcarrier mapping block 604, the IDFT block 606, and the P/S block 608 at 615, respectively. Accordingly, the P/S block 628 may output an OFDM symbol 632 that may be similar to the OFDM symbol 610. In other words, the OFDM symbol 632 may include a ZH portion, a data portion, and a ZT portion. Here, a time domain UW symbol 630 including a UW header portion, a blank data portion, and a UW tail portion may be combined with the OFDM symbol 632 to generate an OFDM symbol 634 including a UW header portion, a data portion, and a UW tail portion.

In yet another configuration, at 655, another OFDM symbol including a UW header portion, a data portion, and a UW tail portion may be generated using a different approach from that used at 635. In particular, the UW header, the data, and the UW tail may be inputted into a DFT block 642. The DFT block 642, the subcarrier mapping block 644, the IDFT block 646, and the P/S block 648 may correspond to and be similar to the DFT block 602, the subcarrier mapping block 604, the IDFT block 606, and the P/S block 608 at 615, respectively. Because the UW header and the UW tail are included in the input to the DFT block 642, the P/S block 648 may output an OFDM symbol 650 including a UW header portion, a data portion, and a UW tail portion.

To maintain alignment between GI-based and CP-based slots and to use the same DFT length, a GI-based slot may not be self-contained. For example, the last GI associated with the last symbol of the previous GI-based slot may be used for the current GI-based slot. For instance, a slot with 14 CP-based symbols using the prespecified CP and DFT lengths may be equal in duration to a slot with 15 GI-based symbols associated with equivalent GI and DFT lengths. However, for the slot with GI-based symbols (i.e., a GI-base slot), the last GI associated with the last symbol in the previous slot may be used for the current slot.

As for a CP-based slot, as described above, because a CP may contain random or indeterminate data, the CP may not be used for purposes such as synchronization, channel estimation, or phase estimation or tracking. Therefore, the CP in a CP-based waveform may represent pure overhead. A CP-based system may be adapted to include GIs so as to benefit from some of the advantages associated with the GI while maintaining the same slot structure for the CP. The CP slot structure may be maintained so as to maintain support for FDM with other users. The CP slot structure may also be used when the previous slot may not be utilized and therefore no GI associated with the previous slot may be utilized for a GI-based slot. The GI-based slot may be associated with several advantages. For example, GIs including zero samples (e.g., ZH/ZT) may act as time gaps for beam switching or uplink/downlink switching. Further, the GI length may be changed to adapt to different delay spreads. Moreover, GIs including UW samples may be used for synchronization, channel estimation, PN estimation, etc. Because different slots or symbols may be associated with different use cases or specifications, an adaptable and dynamic slot or symbol format design may be desirable.

Figure 7:
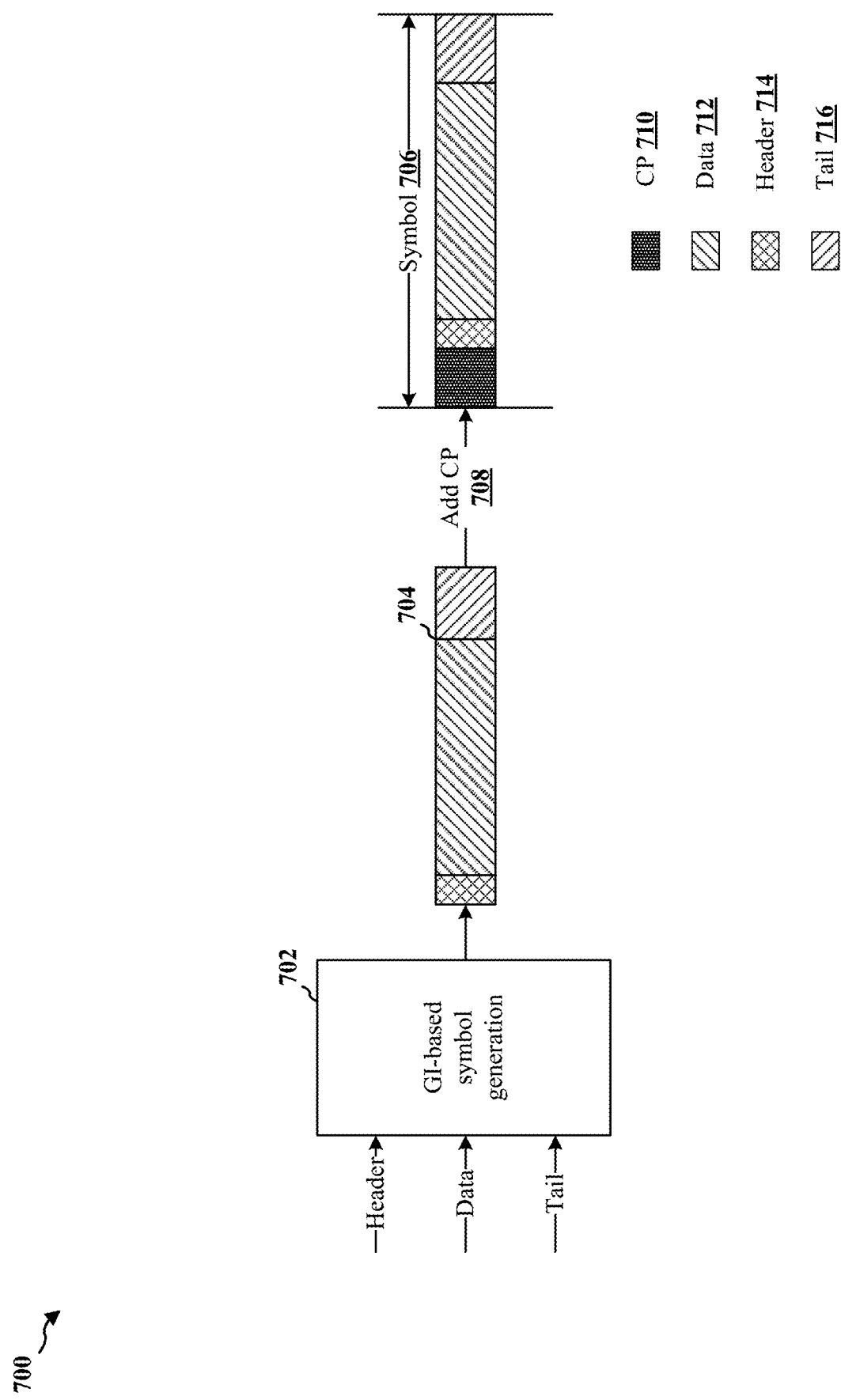
FIG. 7 is a diagram illustrating an example process of generating a hybrid symbol.

FIG. 7 is a diagram 700 illustrating an example process of generating a hybrid symbol. A hybrid waveform symbol (or a hybrid symbol for short) including both a CP and GI-like known header and/or tail samples (e.g., ZH, ZT, UW header, or UW tail) may be defined. The hybrid symbol may resemble a CP symbol with a header and/or a tail added to the symbol before and/or after the data portion, or may resemble a GI symbol with a CP appended to the beginning of the symbol. As shown in FIG. 7, in one or more examples, the header (e.g., ZH or UW header), the data, and the tail (e.g., ZT or UW tail) may be inputted into a GI-based symbol generation block 702. The GI-based symbol generation block 702 may output a GI symbol 704 including a header portion 714, a data portion 712, and a tail portion 716. In some configurations, either the header portion 714 or the tail portion 716 may not be present in the symbol 704. Further, at 708, a CP 710 may be added to the symbol 704 to generate a hybrid symbol 706. Adding the CP 710 may include taking a predetermined number of samples at the end of the symbol 704 and copying these samples at the beginning of the symbol. Accordingly, the hybrid symbol 706 may include a CP portion 710, a header portion 714, a data portion 712, and a tail portion 716. In some configurations, either the header portion 714 or the tail portion 716 may not be present in the hybrid symbol 706.

In one or more configurations, the waveform including one or more hybrid symbols may be one of an OFDM waveform, a DFT-s-OFDM waveform, an SC waveform (e.g., an SC-FDE waveform or an SC-QAM waveform), or any other suitable waveform where a header or a tail may be added to the symbols. In different configurations, the header and/or the tail in the hybrid symbol 706 may be zeroes (i.e., ZH and/or ZT) or a known sequence (e.g., UW header and/or UW tail).

In one or more configurations, any suitable GI-based signal or symbol generation processes may be utilized at the GI-based symbol generation block 702 to generate the symbol 704. Non-limiting examples of GI-based signal or symbol generation processes may include those illustrated back in FIGS. 5 and 6.

In one or more configurations where the tail portion 716 is present, the length of the CP portion 710 may or may not be the same as the length of the tail portion 716.

Figure 8:
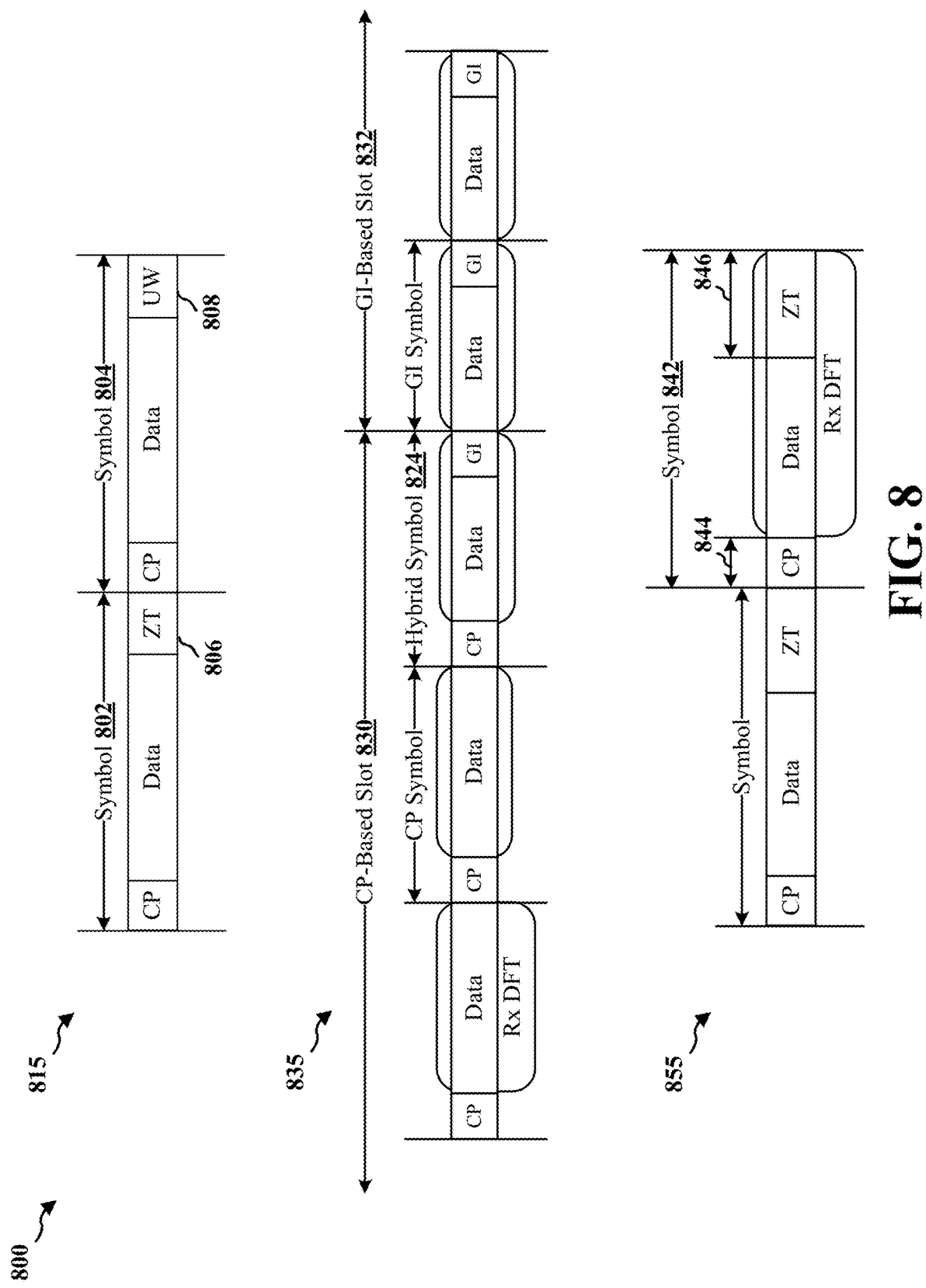
FIG. 8 is a diagram illustrating various example use cases of hybrid symbols.

FIG. 8 is a diagram 800 illustrating various example use cases of hybrid symbols. For example, at 815, the ZT 806 in the hybrid symbol 802 (which may also include a CP) may be used, together with the CP in the symbol 804, as a time gap for the purpose of beam switching or uplink/downlink switching. In another example, also at 815, the UW tail 808 in the hybrid symbol 804 (which may also include a CP) may be used as signals for various purposes such as synchronization, channel estimation, PN estimation, etc.

In a further example, at 835, a hybrid symbol 824 including both a CP and a GI tail may be the last symbol in a CP-based slot 830. The subsequent slot may be a GI-based slot 832. Accordingly, the hybrid symbol 824 may enable the switch from a CP-based waveform slot 830 to a GI-based waveform slot 832. The switch may work because a GI-based slot may use the GI associated with the last symbol in the previous slot, and the GI tail of the hybrid symbol 824 may be used for the GI-based slot 832 in this way.

In still another example, at 855, the period 844 may indicate the delay spread allowed based on the CP in the CP-based symbols. The period 846 may indicate a new delay spread allowed based on the ZT in the hybrid symbol 842 including both a CP and a ZT. As described above, the length of the GI tail may be adjusted to accommodate different delay spreads.

In one or more configurations, a base station may indicate to a UE a hybrid symbol structure or configuration including one or more formats associated with the hybrid symbol. The indication may be sent via RRC signaling, a MAC—control element (CE) (MAC-CE), or a DCI message. The hybrid symbol structure or configuration may correspond to one or more of a presence or absence of the header portion, a presence or absence of the tail portion, a length of the header portion, a length of the tail portion, a type of the header portion (e.g., a ZH or a UW header), or a type of the tail portion (e.g., a ZT or a UW tail).

In one configuration, different hybrid symbols in a slot may be associated with different hybrid symbol structures, formats, or configurations. In one configuration, different hybrid symbols in a slot may be associated with the same hybrid symbol structures, formats, or configurations.

In one configuration, the indication of the hybrid symbol structure or configuration from the base station may be associated with at least one of a single UE, a group (set) of UEs, a single beam/TCI state, a set of beams/TCI states, all beams, a single sub-band, a set of sub-bands, all sub-bands, a single UE antenna panel, a group (set) of UE antenna panels, a single channel (e.g., a PUCCH, a PUSCH, a PDCCH, a PDSCH, etc.), a set of channels, or all channels.

In one configuration, the configuration of a hybrid symbol may be implicitly based on one or more predefined rules. For example, a hybrid symbol of a particular predefined format may be generated and used when a beam/TCI state switch is performed.

In one or more configurations, the indication of the hybrid symbol structure or configuration may be associated with all symbols after the indication, a predefined application pattern (e.g., the hybrid symbol structure or configuration may be applied based on a predefined time pattern), or a preconfigured time period (e.g., the hybrid symbol structure or configuration may be applied during the preconfigured time period).

In one configuration, the UE may transmit, to the base station, an indication of a recommendation for the hybrid symbol structure or configuration. The UE may transmit the indication of the recommendation via a UE assistance information message. The UE may transmit the indication of the recommendation when a rule is met. The rule may relate to conditions (e.g., metric, thresholds, etc.) associated with a corresponding recommendation. The rule may be based on an indication received from the base station, or may be a prespecified rule. Accordingly, the indication of the hybrid symbol structure or configuration from the base station may be based on the indication of the recommendation from the UE.

In one or more configurations, the indication of the recommended hybrid symbol structure or configuration may be associated with a single UE antenna panel or a group (set) of UE antenna panels.

In one configuration, application at the UE of the hybrid symbol structure or configuration may be associated with a time delay starting from the reception at the UE from the base station of the indication of the hybrid symbol structure or configuration. The time delay may be preconfigured. In one or more configurations, the time delay may be based on at least one of a time delay indication from the base station, a prespecification, or a capability of the UE.

Figure 9:
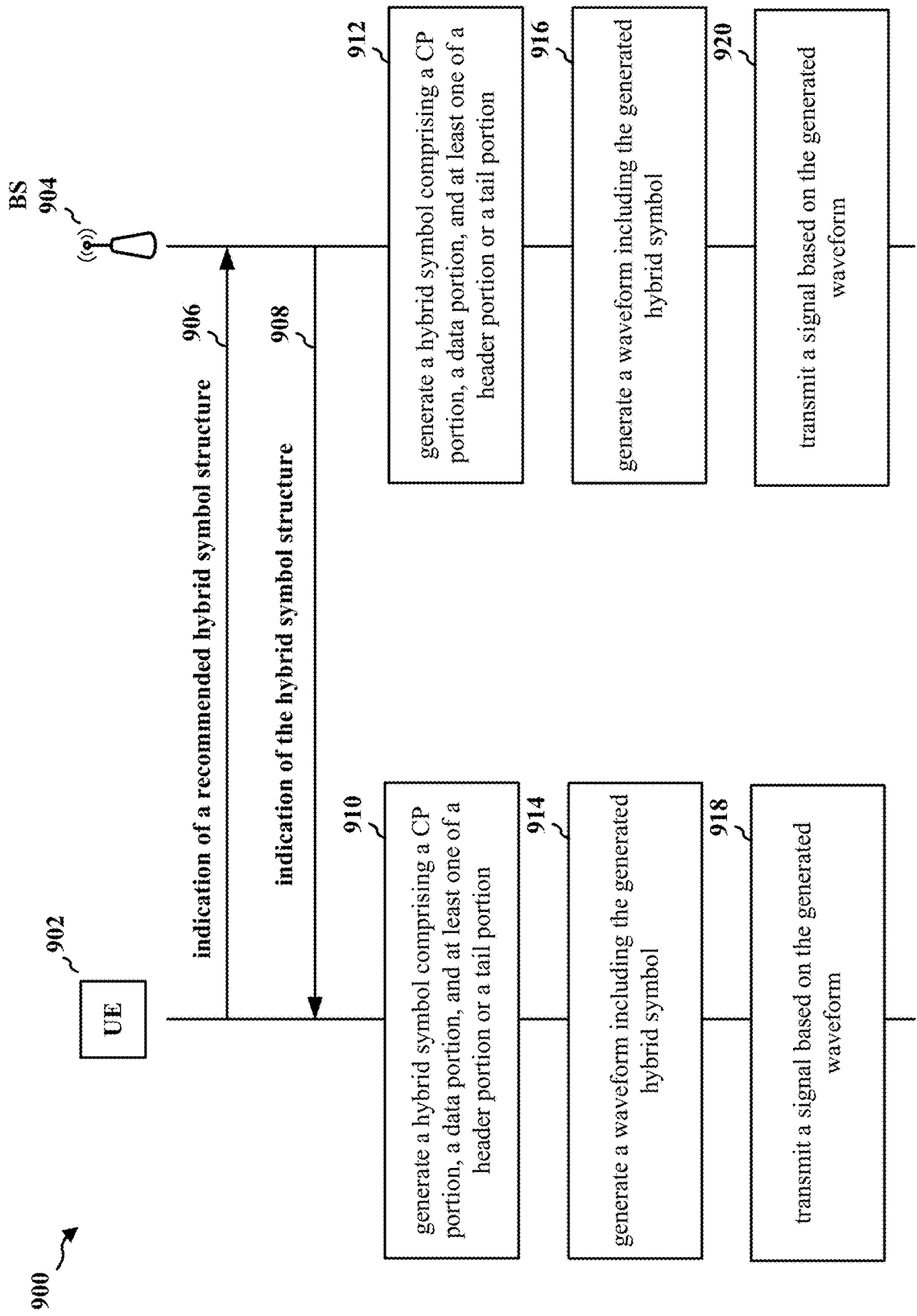
FIG. 9 is a diagram of a communication flow of a method of wireless communication.

FIG. 9 is a diagram of a communication flow 900 of a method of wireless communication. If a UE 902 is the TX, at 906, the UE 902 may transmit, to the base station 904, and the base station 904 may receive, from the UE 902, an indication of a recommended hybrid symbol structure. The indication of the recommended hybrid symbol structure 906 may be transmitted by the UE based on a rule being met. The rule may be based on an indication of the rule received from the base station 904 or a prespecification. The indication of the recommended hybrid symbol structure 906 may be associated with a single UE antenna panel or a set of UE antenna panels.

At 908, the base station 904 may transmit, to the UE 902, and the UE 902 may receive, from the base station 904, an indication of a first hybrid symbol structure associated with the UE. The indication of the hybrid symbol structure 908 may be based on the indication of the recommended hybrid symbol structure 906. The hybrid symbol structure may correspond to one or more of a presence or absence of the header portion, a presence or absence of the tail portion, a length of the header portion, a length of the tail portion, a type of the header portion, or a type of the tail portion.

In one configuration, the base station 904 may transmit, to the UE 902, and the UE 902 may receive, from the base station 904, the indication of the hybrid symbol structure 908 via an RRC message, a MAC-CE, or a DCI message.

In one or more configurations, the hybrid symbol structure may be associated with at least one of a single UE, a set of UEs, a single beam, a single TCI state, a set of beams, a single sub-band, a set of sub-bands, a single UE antenna panel, a set of UE antenna panels, a single channel, or a set of channels. It should be appreciated that a TCI state may include configurations such as quasi co-location (QCL) relationships between reference signals or antenna ports.

In one or more configurations, the hybrid symbol structure may be associated with a slot resolution or a sub-slot resolution.

In one or more configurations, the indication of the hybrid symbol structure may be associated with all symbols after the indication, a predefined application pattern (e.g., a time pattern), or a preconfigured time period.

In one configuration, application of the hybrid symbol structure may be associated with a time delay from the indication of the hybrid symbol structure 908. The time delay may be based on at least one of a time delay indication received from the base station 904, a prespecification, or a UE 902 capability.

At 910, the UE 902 may generate a hybrid symbol including a CP portion, a data portion, and at least one of a header portion or a tail portion. The hybrid symbol may be generated based on the hybrid symbol structure. The CP portion may be located at a beginning of the hybrid symbol, and may include one or more CP samples that correspond to a predefined number of samples at an end of the hybrid symbol. The data portion may be located after the header portion or before the tail portion. The header portion may be located after the CP portion, and may include one or more predefined header samples. The tail portion may be located at the end of the hybrid symbol, and may include one or more predefined tail samples.

In one configuration, the one or more predefined header samples may include one or more zeroes (i.e., a ZH) or a predefined first sequence (i.e., a UW header). The one or more predefined tail samples may include one or more zeroes (i.e., a ZT) or a predefined second sequence (i.e., a UW tail).

In one configuration, the one or more CP samples may include a same number of samples as the one or more predefined tail samples. In another configuration, the one or more CP samples may include a different number of samples from the one or more predefined tail samples.

In one configuration, a second hybrid symbol may be located in a same slot as the hybrid symbol. The second hybrid symbol may be associated with a second hybrid symbol structure different from the hybrid symbol structure. Further, a configuration of the slot may be based on a slot configuration indication received from the base station 904 or a predefined rule.

At 914, the UE 902 may generate a waveform including the generated hybrid symbol.

In one or more configurations, the waveform may be one of an OFDM waveform, a DFT-s-OFDM waveform, or an SC waveform.

At 918, the UE 902 may transmit a signal based on the generated waveform.

If the base station 904 is the TX, at 912, the base station 904 may generate a hybrid symbol including a CP portion, a data portion, and at least one of a header portion or a tail portion. The CP portion may be located at a beginning of the hybrid symbol, and may include one or more CP samples that correspond to a predefined number of samples at an end of the hybrid symbol. The data portion may be located after the header portion or before the tail portion. The header portion may be located after the CP portion, and may include one or more predefined header samples. The tail portion may be located at the end of the hybrid symbol, and may include one or more predefined tail samples.

In one or more configurations, the hybrid symbol may be generated based on a hybrid symbol structure. The hybrid symbol structure may correspond to one or more of a presence or absence of the header portion, a presence or absence of the tail portion, a length of the header portion, a length of the tail portion, a type of the header portion, or a type of the tail portion.

In one or more configurations, the hybrid symbol structure may be associated with a slot resolution or a sub-slot resolution.

In one configuration, a second hybrid symbol may be located in a same slot as the hybrid symbol. The second hybrid symbol may be associated with a second hybrid symbol structure different from the hybrid symbol structure. In one configuration, a configuration of the slot may be based on a predefined rule.

At 916, the base station 904 may generate a waveform including the generated hybrid symbol.

In one or more configurations, the waveform may be one of an OFDM waveform, a DFT-s-OFDM waveform, or an SC waveform.

In one configuration, the one or more predefined header samples may include one or more zeroes (i.e., a ZH) or a predefined first sequence (i.e., a UW header). The one or more predefined tail samples may include one or more zeroes (i.e., a ZT) or a predefined second sequence (i.e., a UW tail).

In one configuration, the one or more CP samples may include a same number of samples as the one or more predefined tail samples. In another configuration, the one or more CP samples may include a different number of samples from the one or more predefined tail samples.

At 920, the base station 904 may transmit a signal based on the generated waveform.

Figure 10:
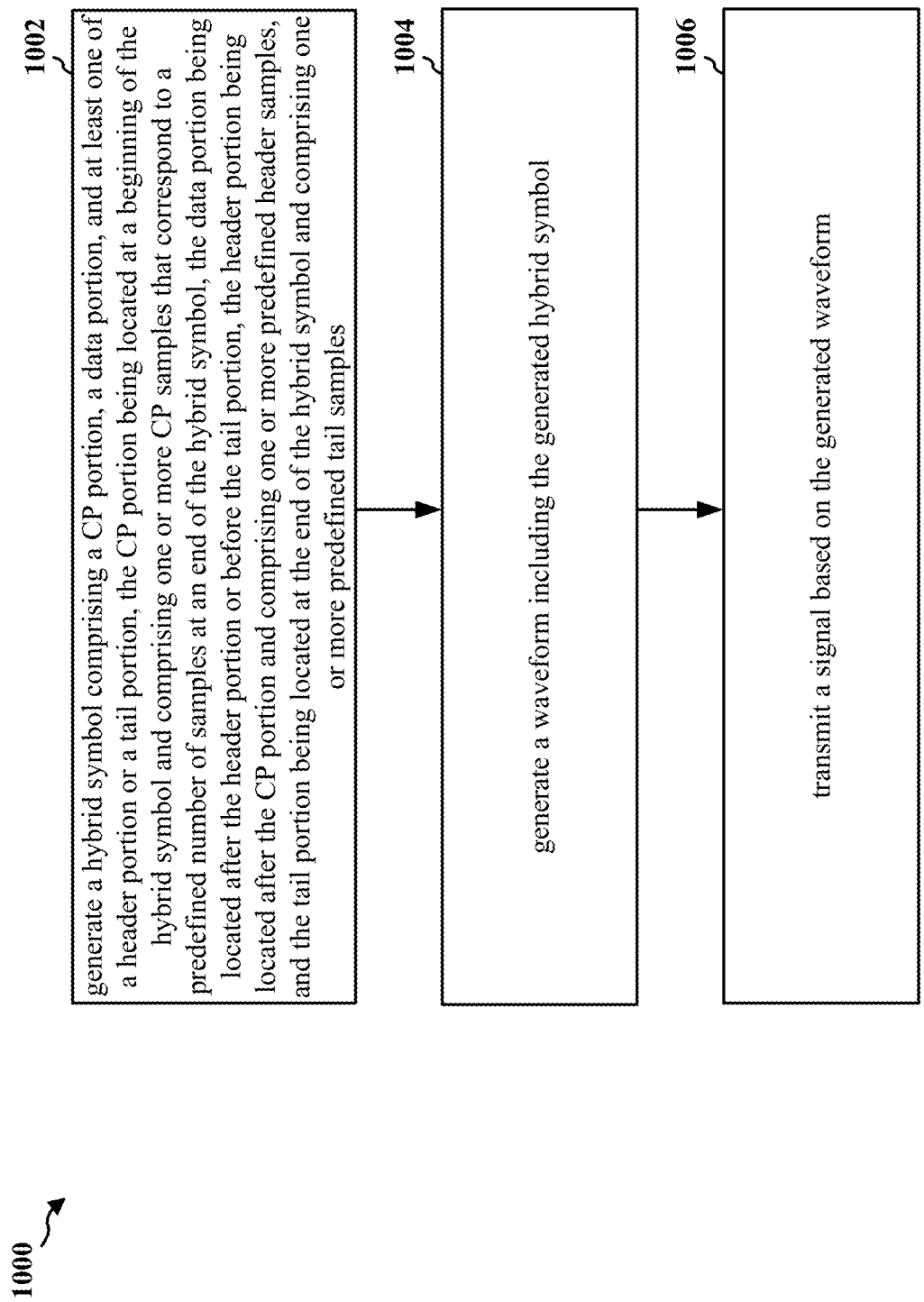
FIG. 10 is a flowchart of a method of wireless communication.

FIG. 10 is a flowchart 1000 of a method of wireless communication. The method may be performed by a UE (e.g., the UE 104/350/902; the apparatus 1402). At 1002, the UE may generate a hybrid symbol including a CP portion, a data portion, and at least one of a header portion or a tail portion. The CP portion may be located at a beginning of the hybrid symbol, and may include one or more CP samples that correspond to a predefined number of samples at an end of the hybrid symbol. The data portion may be located after the header portion or before the tail portion. The header portion may be located after the CP portion, and may include one or more predefined header samples. The tail portion may be located at the end of the hybrid symbol, and may include one or more predefined tail samples. For example, 1002 may be performed by the hybrid symbol component 1440 in FIG. 14. Referring to FIG. 9, at 910, the UE 902 may generate a hybrid symbol including a CP portion, a data portion, and at least one of a header portion or a tail portion.

At 1004, the UE may generate a waveform including the generated hybrid symbol.

Figure 14:
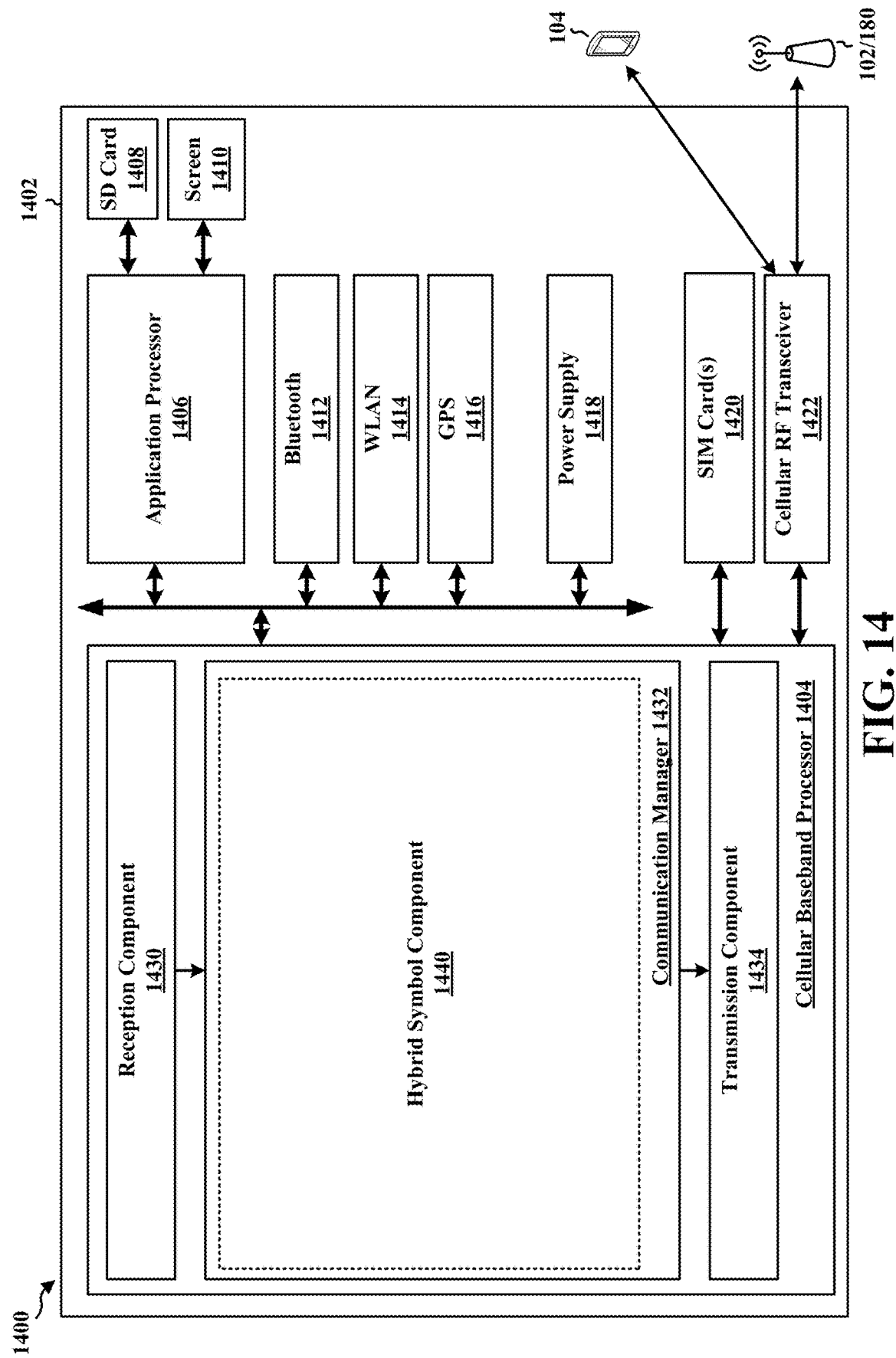
FIG. 14 is a diagram illustrating an example of a hardware implementation for an example apparatus.

For example, 1004 may be performed by the hybrid symbol component 1440 in FIG. 14. Referring to FIG. 9, at 914, the UE 902 may generate a waveform including the generated hybrid symbol.

At 1006, the UE may transmit a signal based on the generated waveform. For example, 1006 may be performed by the hybrid symbol component 1440 in FIG. 14. Referring to FIG. 9, at 918, the UE 902 may transmit a signal based on the generated waveform.

Figure 11:
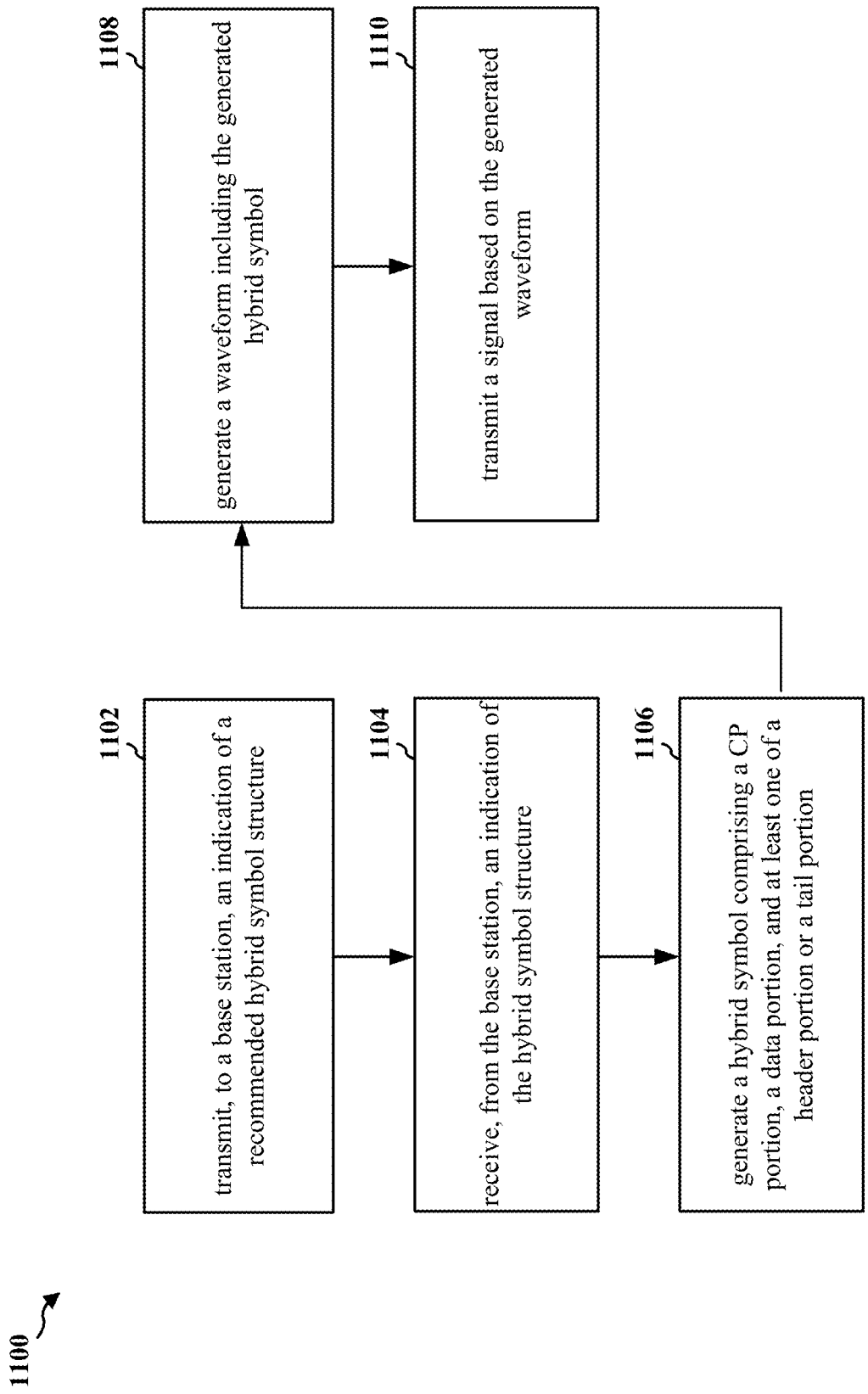
FIG. 11 is a flowchart of a method of wireless communication.

FIG. 11 is a flowchart 1100 of a method of wireless communication. The method may be performed by a UE (e.g., the UE 104/350/902; the apparatus 1402). At 1106, the UE may generate a hybrid symbol including a CP portion, a data portion, and at least one of a header portion or a tail portion. The CP portion may be located at a beginning of the hybrid symbol, and may include one or more CP samples that correspond to a predefined number of samples at an end of the hybrid symbol. The data portion may be located after the header portion or before the tail portion. The header portion may be located after the CP portion, and may include one or more predefined header samples. The tail portion may be located at the end of the hybrid symbol, and may include one or more predefined tail samples. For example, 1106 may be performed by the hybrid symbol component 1440 in FIG. 14. Referring to FIG. 9, at 910, the UE 902 may generate a hybrid symbol including a CP portion, a data portion, and at least one of a header portion or a tail portion.

At 1108, the UE may generate a waveform including the generated hybrid symbol.

For example, 1108 may be performed by the hybrid symbol component 1440 in FIG. 14. Referring to FIG. 9, at 914, the UE 902 may generate a waveform including the generated hybrid symbol.

At 1110, the UE may transmit a signal based on the generated waveform. For example, 1110 may be performed by the hybrid symbol component 1440 in FIG. 14. Referring to FIG. 9, at 918, the UE 902 may transmit a signal based on the generated waveform.

In one configuration, the waveform may be one of an OFDM waveform, a DFT-s-OFDM waveform, or an SC waveform.

In one configuration, the one or more predefined header samples may include one or more zeroes or a predefined first sequence. The one or more predefined tail samples may include one or more zeroes or a predefined second sequence.

In one configuration, the one or more CP samples may include a same number of samples as the one or more predefined tail samples. In one configuration, the one or more CP samples may include a different number of samples from the one or more predefined tail samples.

In one configuration, at 1104, the UE may receive, from a base station, an indication of a hybrid symbol structure. The hybrid symbol may be generated based on the hybrid symbol structure. The hybrid symbol structure may correspond to one or more of a presence or absence of the header portion, a presence or absence of the tail portion, a length of the header portion, a length of the tail portion, a type of the header portion, or a type of the tail portion. For example, 1104 may be performed by the hybrid symbol component 1440 in FIG. 14. Referring to FIG. 9, at 908, the UE 902 may receive, from a base station 904, an indication of a hybrid symbol structure.

In one configuration, referring to FIG. 9, the indication of the hybrid symbol structure 908 may be received from the base station 904 via an RRC message, a MAC-CE, or a DCI message.

In one configuration, the hybrid symbol structure may be associated with at least one of a single UE, a set of UEs, a single beam, a single TCI state, a set of beams, a single sub-band, a set of sub-bands, a single UE antenna panel, a set of UE antenna panels, a single channel, or a set of channels.

In one configuration, a second hybrid symbol may be located in a same slot as the hybrid symbol. The second hybrid symbol may be associated with a second hybrid symbol structure different from the hybrid symbol structure.

In one configuration, a configuration of the slot is based on a slot configuration indication received from the base station or a predefined rule.

In one configuration, the hybrid symbol structure may be associated with a slot resolution or a sub-slot resolution.

In one configuration, referring to FIG. 9, the indication of the hybrid symbol structure 908 may be associated with: all symbols after the indication, a predefined application pattern, or a preconfigured time period.

In one configuration, referring to FIG. 9, application of the hybrid symbol structure may be associated with a time delay from the indication of the hybrid symbol structure 908. The time delay may be based on at least one of a time delay indication received from the base station, a prespecification, or a UE capability.

In one configuration, at 1102, the UE may transmit, to the base station, an indication of a recommended hybrid symbol structure. The indication of the recommended hybrid symbol structure may be transmitted based on a rule being met. The rule may be based on an indication of the rule received from the base station or a prespecification. The indication of the recommended hybrid symbol structure may be associated with a single UE antenna panel or a set of UE antenna panels. The indication of the hybrid symbol structure may be based on the indication of the recommended hybrid symbol structure. For example, 1102 may be performed by the hybrid symbol component 1440 in FIG. 14. Referring to FIG. 9, at 906, the UE 902 may transmit, to the base station 904, an indication of a recommended hybrid symbol structure.

Figure 12:
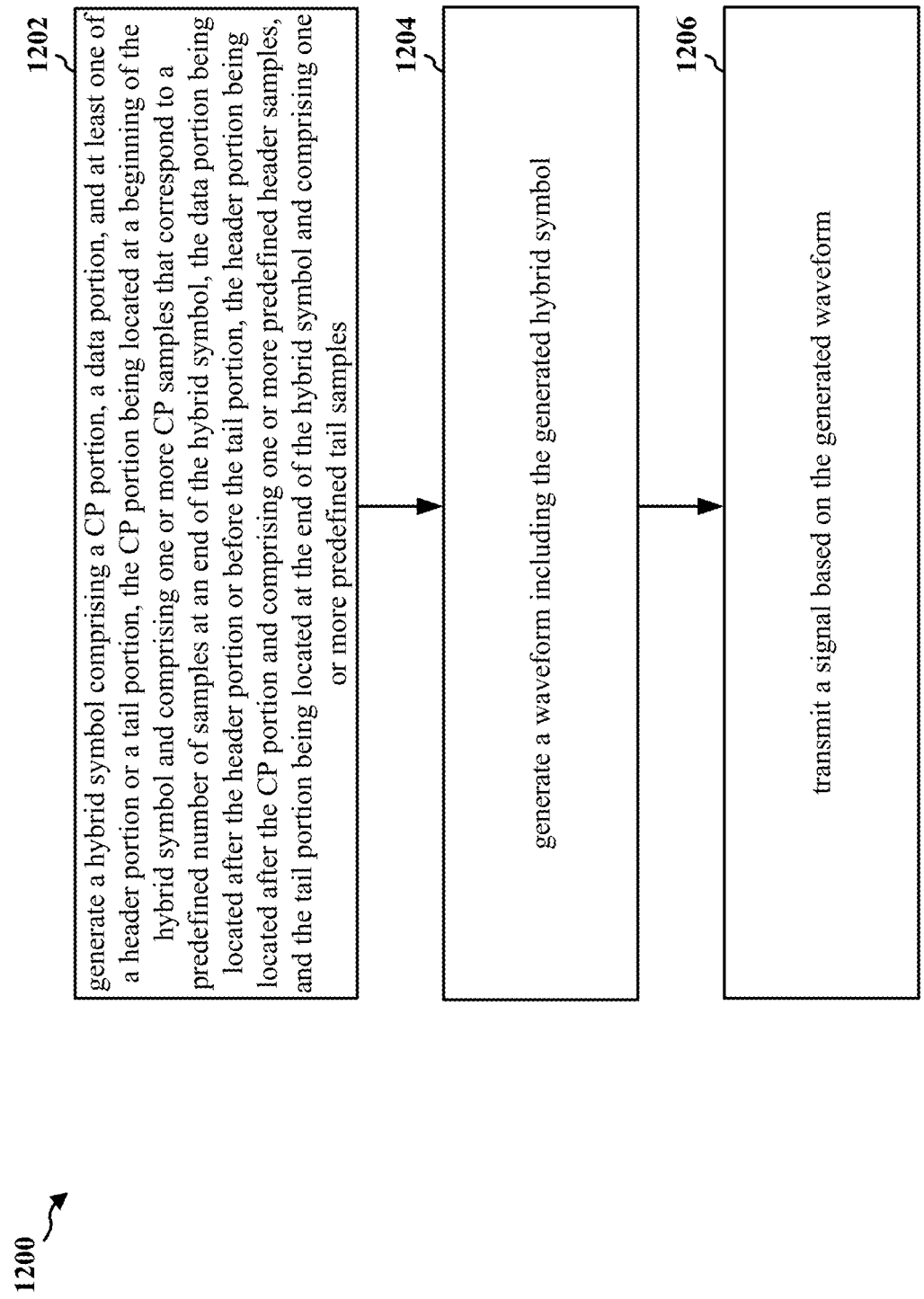
FIG. 12 is a flowchart of a method of wireless communication.

FIG. 12 is a flowchart 1200 of a method of wireless communication. The method may be performed by a base station (e.g., the base station 102/180/310/904; the apparatus 1502). At 1202, the base station may generate a hybrid symbol including a CP portion, a data portion, and at least one of a header portion or a tail portion. The CP portion may be located at a beginning of the hybrid symbol, and may include one or more CP samples that correspond to a predefined number of samples at an end of the hybrid symbol. The data portion may be located after the header portion or before the tail portion. The header portion may be located after the CP portion, and may include one or more predefined header samples. The tail portion may be located at the end of the hybrid symbol, and may include one or more predefined tail samples. For example, 1202 may be performed by the hybrid symbol component 1540 in FIG. 15. Referring to FIG. 9, at 912, the base station 904 may generate a hybrid symbol including a CP portion, a data portion, and at least one of a header portion or a tail portion.

At 1204, the base station may generate a waveform including the generated hybrid symbol. For example, 1204 may be performed by the hybrid symbol component 1540 in FIG. 15. Referring to FIG. 9, at 916, the base station 904 may generate a waveform including the generated hybrid symbol.

At 1206, the base station may transmit a signal based on the generated waveform. For example, 1206 may be performed by the hybrid symbol component 1540 in FIG. 15. Referring to FIG. 9, at 920, the base station 904 may transmit a signal based on the generated waveform.

Figure 13:
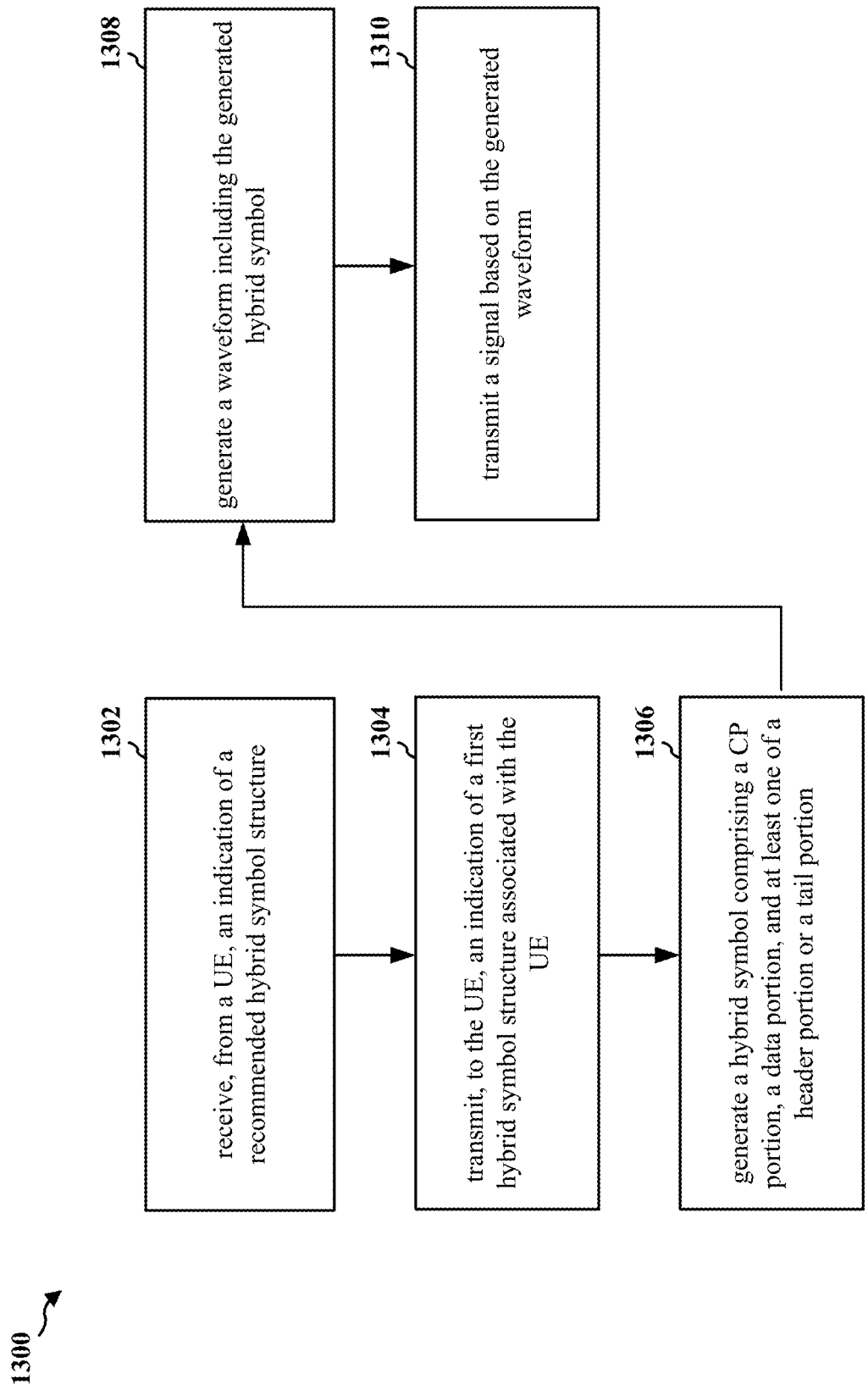
FIG. 13 is a flowchart of a method of wireless communication.

FIG. 13 is a flowchart 1300 of a method of wireless communication. The method may be performed by a base station (e.g., the base station 102/180/310/904; the apparatus 1502). At 1306, the base station may generate a hybrid symbol including a CP portion, a data portion, and at least one of a header portion or a tail portion. The CP portion may be located at a beginning of the hybrid symbol, and may include one or more CP samples that correspond to a predefined number of samples at an end of the hybrid symbol. The data portion may be located after the header portion or before the tail portion. The header portion may be located after the CP portion, and may include one or more predefined header samples. The tail portion may be located at the end of the hybrid symbol, and may include one or more predefined tail samples. For example, 1306 may be performed by the hybrid symbol component 1540 in FIG. 15. Referring to FIG. 9, at 912, the base station 904 may generate a hybrid symbol including a CP portion, a data portion, and at least one of a header portion or a tail portion.

At 1308, the base station may generate a waveform including the generated hybrid symbol. For example, 1308 may be performed by the hybrid symbol component 1540 in FIG. 15. Referring to FIG. 9, at 916, the base station 904 may generate a waveform including the generated hybrid symbol.

At 1310, the base station may transmit a signal based on the generated waveform. For example, 1310 may be performed by the hybrid symbol component 1540 in FIG. 15. Referring to FIG. 9, at 920, the base station 904 may transmit a signal based on the generated waveform.

In one configuration, the waveform may be one of an OFDM waveform, a DFT-s-OFDM waveform, or an SC waveform.

In one configuration, the one or more predefined header samples may include one or more zeroes or a predefined first sequence. The one or more predefined tail samples may include one or more zeroes or a predefined second sequence.

In one configuration, the one or more CP samples may include a same number of samples as the one or more predefined tail samples. In one configuration, the one or more CP samples may include a different number of samples from the one or more predefined tail samples.

In one configuration, the hybrid symbol may be generated based on a hybrid symbol structure. The hybrid symbol structure may correspond to one or more of a presence or absence of the header portion, a presence or absence of the tail portion, a length of the header portion, a length of the tail portion, a type of the header portion, or a type of the tail portion.

In one configuration, a second hybrid symbol may be located in a same slot as the hybrid symbol. The second hybrid symbol may be associated with a second hybrid symbol structure different from the hybrid symbol structure.

In one configuration, a configuration of the slot may be based on a predefined rule.

In one configuration, at 1304, the base station may transmit, to a UE, an indication of a first hybrid symbol structure associated with the UE. The indication of the first hybrid symbol structure may be transmitted to the UE via an RRC message, a MAC-CE, or a DCI message. The first hybrid symbol structure may be associated with a first hybrid symbol at the UE. For example, 1304 may be performed by the hybrid symbol component 1540 in FIG. 15. Referring to FIG. 9, at 908, the base station 904 may transmit, to a UE 902, an indication of a first hybrid symbol structure associated with the UE.

In one configuration, the first hybrid symbol structure may be associated with at least one of a single UE, a set of UEs, a single beam, a single TCI state, a set of beams, a single sub-band, a set of sub-bands, a single UE antenna panel, a set of UE antenna panels, a single channel, or a set of channels.

In one configuration, the first hybrid symbol structure may be associated with a slot resolution or a sub-slot resolution.

In one configuration, referring to FIG. 9, the indication of the first hybrid symbol structure 908 may be associated with: all symbols after the indication, a predefined application pattern, or a preconfigured time period.

In one configuration, application at the UE of the first hybrid symbol structure may be associated with a time delay from the indication of the first hybrid symbol structure. The time delay may be based on at least one of a time delay indication from the base station, a prespecification, or a UE capability.

In one configuration, at 1302, the base station may receive, from the UE, an indication of a recommended hybrid symbol structure. The indication of the recommended hybrid symbol structure may be based on a rule being met. The rule may be based on an indication of the rule from the base station or a prespecification. The indication of the recommended hybrid symbol structure may be associated with a single UE antenna panel or a set of UE antenna panels. The indication of the first hybrid symbol structure may be based on the indication of the recommended hybrid symbol structure. For example, 1302 may be performed by the hybrid symbol component 1540 in FIG. 15. Referring to FIG. 9, at 906, the base station 904 may receive, from the UE 902, an indication of a recommended hybrid symbol structure.

FIG. 14 is a diagram 1400 illustrating an example of a hardware implementation for an apparatus 1402. The apparatus 1402 may be a UE, a component of a UE, or may implement UE functionality. In some aspects, the apparatus 1402 may include a cellular baseband processor 1404 (also referred to as a modem) coupled to a cellular RF transceiver 1422. In some aspects, the apparatus 1402 may further include one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, or a power supply 1418. The cellular baseband processor 1404 communicates through the cellular RF transceiver 1422 with the UE 104 and/or BS 102/180. The cellular baseband processor 1404 may include a computer-readable medium/memory. The computer-readable medium/memory may be non-transitory. The cellular baseband processor 1404 is responsible for general processing, including the execution of software stored on the computer-readable medium/memory. The software, when executed by the cellular baseband processor 1404, causes the cellular baseband processor 1404 to perform the various functions described supra. The computer-readable medium/memory may also be used for storing data that is manipulated by the cellular baseband processor 1404 when executing software. The cellular baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the cellular baseband processor 1404. The cellular baseband processor 1404 may be a component of the UE 350 and may include the memory 360 and/or at least one of the TX processor 368, the RX processor 356, and the controller/processor 359. In one configuration, the apparatus 1402 may be a modem chip and include just the baseband processor 1404, and in another configuration, the apparatus 1402 may be the entire UE (e.g., see 350 of FIG. 3) and include the additional modules of the apparatus 1402.

The communication manager 1432 includes a hybrid symbol component 1440 that may be configured to transmit, to the base station, an indication of a recommended hybrid symbol structure, e.g., as described in connection with 1102 in FIG. 11. The hybrid symbol component 1440 may be configured to receive, from a base station, an indication of a hybrid symbol structure, e.g., as described in connection with 1104 in FIG. 11. The hybrid symbol component 1440 may be configured to generate a hybrid symbol including a CP portion, a data portion, and at least one of a header portion or a tail portion, e.g., as described in connection with 1002 in FIGS. 10 and 1106 in FIG. 11. The hybrid symbol component 1440 may be configured to generate a waveform including the generated hybrid symbol, e.g., as described in connection with 1004 in FIGS. 10 and 1108 in FIG. 11. The hybrid symbol component 1440 may be configured to transmit a signal based on the generated waveform, e.g., as described in connection with 1006 in FIGS. 10 and 1110 in FIG. 11.

The apparatus may include additional components that perform each of the blocks of the algorithm in the flowcharts of FIGS. 9-11. As such, each block in the flowcharts of FIGS. 9-11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the cellular baseband processor 1404, includes means for generating a hybrid symbol including a CP portion, a data portion, and at least one of a header portion or a tail portion. The CP portion may be located at a beginning of the hybrid symbol, and may include one or more CP samples that correspond to a predefined number of samples at an end of the hybrid symbol. The data portion may be located after the header portion or before the tail portion. The header portion may be located after the CP portion, and may include one or more predefined header samples. The tail portion may be located at the end of the hybrid symbol, and may include one or more predefined tail samples. The apparatus 1402, and in particular the cellular baseband processor 1404, includes means for generating a waveform including the generated hybrid symbol. The apparatus 1402, and in particular the cellular baseband processor 1404, includes means for transmitting a signal based on the generated waveform.

In one configuration, the waveform may be one of an OFDM waveform, a DFT-s-OFDM waveform, or an SC waveform. In one configuration, the one or more predefined header samples may include one or more zeroes or a predefined first sequence. The one or more predefined tail samples may include one or more zeroes or a predefined second sequence. In one configuration, the one or more CP samples may include a same number of samples as the one or more predefined tail samples. In one configuration, the one or more CP samples may include a different number of samples from the one or more predefined tail samples. In one configuration, apparatus 1402, and in particular the cellular baseband processor 1404, includes means for receiving, from a base station, an indication of a hybrid symbol structure. The hybrid symbol may be generated based on the hybrid symbol structure. The hybrid symbol structure may correspond to one or more of a presence or absence of the header portion, a presence or absence of the tail portion, a length of the header portion, a length of the tail portion, a type of the header portion, or a type of the tail portion. In one configuration, the indication of the hybrid symbol structure may be received from the base station 904 via an RRC message, a MAC-CE, or a DCI message. In one configuration, the hybrid symbol structure may be associated with at least one of a single UE, a set of UEs, a single beam, a single TCI state, a set of beams, a single sub-band, a set of sub-bands, a single UE antenna panel, a set of UE antenna panels, a single channel, or a set of channels. In one configuration, a second hybrid symbol may be located in a same slot as the hybrid symbol. The second hybrid symbol may be associated with a second hybrid symbol structure different from the hybrid symbol structure. In one configuration, a configuration of the slot is based on a slot configuration indication received from the base station or a predefined rule. In one configuration, the hybrid symbol structure may be associated with a slot resolution or a sub-slot resolution. In one configuration, the indication of the hybrid symbol structure may be associated with: all symbols after the indication, a predefined application pattern, or a preconfigured time period. In one configuration, application of the hybrid symbol structure may be associated with a time delay from the indication of the hybrid symbol structure 908. The time delay may be based on at least one of a time delay indication received from the base station, a prespecification, or a UE capability. In one configuration, the apparatus 1402, and in particular the cellular baseband processor 1404, includes means for transmitting, to the base station, an indication of a recommended hybrid symbol structure. The indication of the recommended hybrid symbol structure may be transmitted based on a rule being met. The rule may be based on an indication of the rule received from the base station or a prespecification. The indication of the recommended hybrid symbol structure may be associated with a single UE antenna panel or a set of UE antenna panels. The indication of the hybrid symbol structure may be based on the indication of the recommended hybrid symbol structure.

The means may be one or more of the components of the apparatus 1402 configured to perform the functions recited by the means. As described supra, the apparatus 1402 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 15:
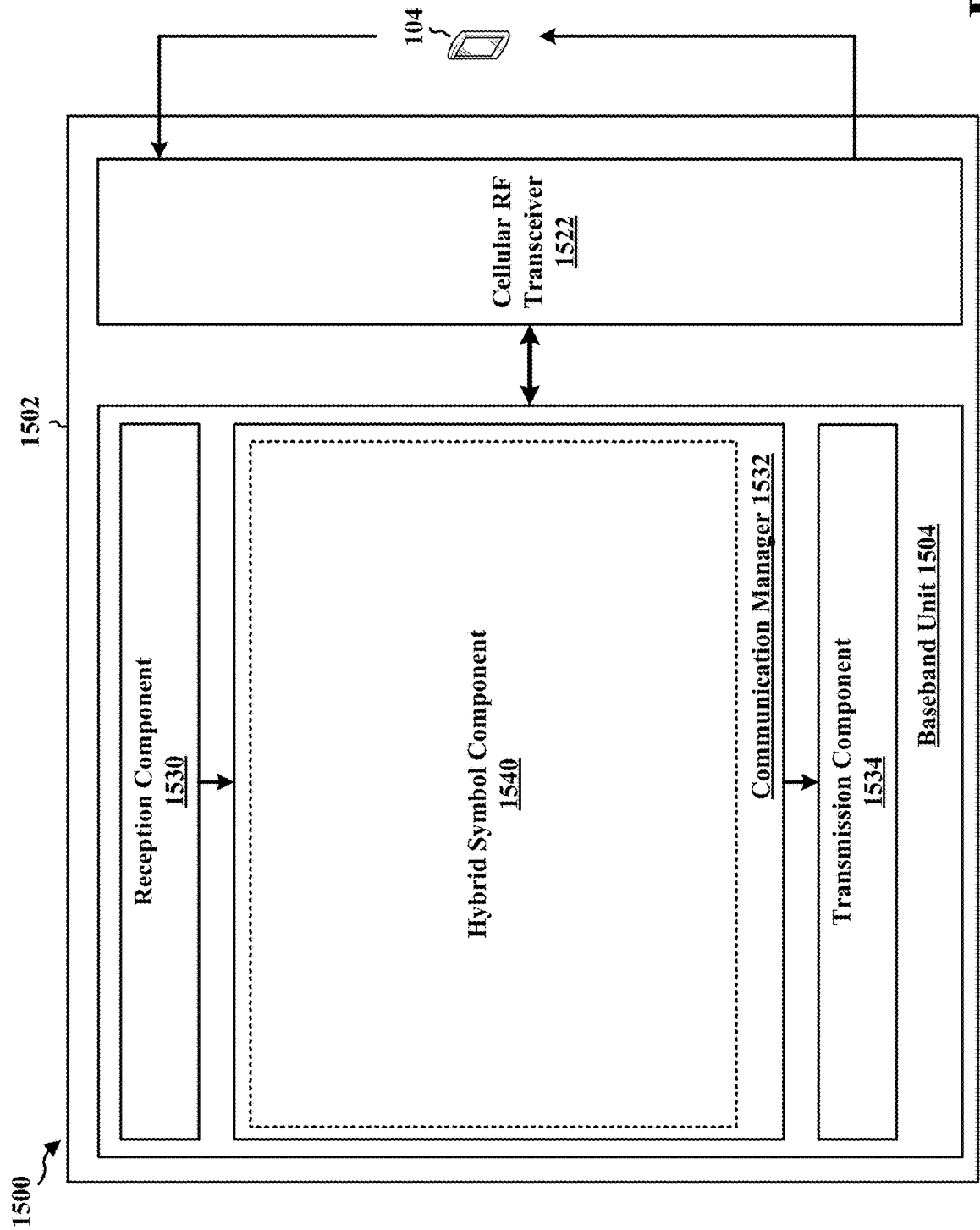
FIG. 15 is a diagram illustrating an example of a hardware implementation for an example apparatus.

FIG. 15 is a diagram 1500 illustrating an example of a hardware implementation for an apparatus 1502. The apparatus 1502 may be a base station, a component of a base station, or may implement base station functionality. In some aspects, the apparatus 1502 may include a baseband unit 1504. The baseband unit 1504 may communicate through a cellular RF transceiver 1522 with the UE 104. The baseband unit 1504 may include a computer-readable medium/memory. The baseband unit 1504 is responsible for general processing, including the execution of software stored on the computer-readable medium/memory. The software, when executed by the baseband unit 1504, causes the baseband unit 1504 to perform the various functions described supra. The computer-readable medium/memory may also be used for storing data that is manipulated by the baseband unit 1504 when executing software. The baseband unit 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the baseband unit 1504. The baseband unit 1504 may be a component of the base station 310 and may include the memory 376 and/or at least one of the TX processor 316, the RX processor 370, and the controller/processor 375.

The communication manager 1532 includes a hybrid symbol component 1540 that may be configured to receive, from the UE, an indication of a recommended hybrid symbol structure, e.g., as described in connection with 1302 in FIG. 13. The hybrid symbol component 1540 that may be configured to transmit, to a UE, an indication of a first hybrid symbol structure associated with the UE, e.g., as described in connection with 1304 in FIG. 13. The hybrid symbol component 1540 that may be configured to generate a hybrid symbol including a CP portion, a data portion, and at least one of a header portion or a tail portion, e.g., as described in connection with 1202 in FIGS. 12 and 1306 in FIG. 13. The hybrid symbol component 1540 that may be configured to generate a waveform including the generated hybrid symbol, e.g., as described in connection with 1204 in FIGS. 12 and 1308 in FIG. 13. The hybrid symbol component 1540 that may be configured to transmit a signal based on the generated waveform, e.g., as described in connection with 1206 in FIGS. 12 and 1310 in FIG. 13.

The apparatus may include additional components that perform each of the blocks of the algorithm in the flowcharts of FIGS. 9, 12, and 13. As such, each block in the flowcharts of FIGS. 9, 12, and 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1502 may include a variety of components configured for various functions. In one configuration, the apparatus 1502, and in particular the baseband unit 1504, includes means for generating a hybrid symbol including a CP portion, a data portion, and at least one of a header portion or a tail portion. The CP portion may be located at a beginning of the hybrid symbol, and may include one or more CP samples that correspond to a predefined number of samples at an end of the hybrid symbol. The data portion may be located after the header portion or before the tail portion. The header portion may be located after the CP portion, and may include one or more predefined header samples. The tail portion may be located at the end of the hybrid symbol, and may include one or more predefined tail samples. The apparatus 1502, and in particular the cellular baseband processor 1504, includes means for generating a waveform including the generated hybrid symbol. The apparatus 1502, and in particular the cellular baseband processor 1504, includes means for transmitting a signal based on the generated waveform.

In one configuration, the waveform may be one of an OFDM waveform, a DFT-s-OFDM waveform, or an SC waveform. In one configuration, the one or more predefined header samples may include one or more zeroes or a predefined first sequence. The one or more predefined tail samples may include one or more zeroes or a predefined second sequence. In one configuration, the one or more CP samples may include a same number of samples as the one or more predefined tail samples. In one configuration, the one or more CP samples may include a different number of samples from the one or more predefined tail samples. In one configuration, the hybrid symbol may be generated based on a hybrid symbol structure. The hybrid symbol structure may correspond to one or more of a presence or absence of the header portion, a presence or absence of the tail portion, a length of the header portion, a length of the tail portion, a type of the header portion, or a type of the tail portion. In one configuration, a second hybrid symbol may be located in a same slot as the hybrid symbol. The second hybrid symbol may be associated with a second hybrid symbol structure different from the hybrid symbol structure. In one configuration, a configuration of the slot may be based on a predefined rule. In one configuration, the apparatus 1502, and in particular the cellular baseband processor 1504, includes means for transmitting, to a UE, an indication of a first hybrid symbol structure associated with the UE. The indication of the first hybrid symbol structure may be transmitted to the UE via an RRC message, a MAC-CE, or a DCI message. The first hybrid symbol structure may be associated with a first hybrid symbol at the UE. In one configuration, the first hybrid symbol structure may be associated with at least one of a single UE, a set of UEs, a single beam, a single TCI state, a set of beams, a single sub-band, a set of sub-bands, a single UE antenna panel, a set of UE antenna panels, a single channel, or a set of channels. In one configuration, the first hybrid symbol structure may be associated with a slot resolution or a sub-slot resolution. In one configuration, the indication of the first hybrid symbol structure may be associated with: all symbols after the indication, a predefined application pattern, or a preconfigured time period. In one configuration, application at the UE of the first hybrid symbol structure may be associated with a time delay from the indication of the first hybrid symbol structure. The time delay may be based on at least one of a time delay indication from the base station, a prespecification, or a UE capability. In one configuration, the apparatus 1502, and in particular the cellular baseband processor 1504, includes means for receiving, from the UE, an indication of a recommended hybrid symbol structure. The indication of the recommended hybrid symbol structure may be based on a rule being met. The rule may be based on an indication of the rule from the base station or a prespecification. The indication of the recommended hybrid symbol structure may be associated with a single UE antenna panel or a set of UE antenna panels. The indication of the first hybrid symbol structure may be based on the indication of the recommended hybrid symbol structure.

The means may be one or more of the components of the apparatus 1502 configured to perform the functions recited by the means. As described supra, the apparatus 1502 may include the TX Processor 316, the RX Processor 370, and the controller/processor 375. As such, in one configuration, the means may be the TX Processor 316, the RX Processor 370, and the controller/processor 375 configured to perform the functions recited by the means.

Referring back to FIGS. 4-15, a wireless device (e.g., a UE or a base station) may generate a hybrid symbol including a CP portion, a data portion, and at least one of a header portion or a tail portion. The CP portion may be located at a beginning of the hybrid symbol, and may include one or more CP samples that correspond to a predefined number of samples at an end of the hybrid symbol. The data portion may be located after the header portion or before the tail portion. The header portion may be located after the CP portion, and may include one or more predefined header samples. The tail portion may be located at the end of the hybrid symbol, and may include one or more predefined tail samples. The wireless device may generate a waveform including the generated hybrid symbol. The wireless device may transmit a signal based on the generated waveform. Accordingly, advantages associated with the GI may be realized in a CP-based system. For example, GIs including zero samples (e.g., ZH/ZT) may act as gaps for beam switching or uplink/downlink switching. Further, the GI length may be changed to adapt to different delay spreads. Moreover, GIs including UW samples may be used for synchronization, channel estimation, PN estimation, etc.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to generate a hybrid symbol including a CP portion, a data portion, and at least one of a header portion or a tail portion, the CP portion being located at a beginning of the hybrid symbol and including one or more CP samples that correspond to a predefined number of samples at an end of the hybrid symbol, the data portion being located after the header portion or before the tail portion, the header portion being located after the CP portion and including one or more predefined header samples, and the tail portion being located at the end of the hybrid symbol and including one or more predefined tail samples; generate a waveform including the generated hybrid symbol; and transmit a signal based on the generated waveform.

Aspect 2 is the apparatus of aspect 1, where the waveform is one of an OFDM waveform, a DFT-s-OFDM waveform, or an SC waveform.

Aspect 3 is the apparatus of any of aspects 1 and 2, where the one or more predefined header samples include one or more zeroes or a predefined first sequence, and the one or more predefined tail samples include one or more zeroes or a predefined second sequence.

Aspect 4 is the apparatus of any of aspects 1 to 3, where the one or more CP samples include a same number of samples as the one or more predefined tail samples.

Aspect 5 is the apparatus of any of aspects 1 to 3, where the one or more CP samples include a different number of samples from the one or more predefined tail samples.

Aspect 6 is the apparatus of any of aspects 1 to 5, the at least one processor being further configured to: receive, from a base station, an indication of a hybrid symbol structure, where the hybrid symbol is generated based on the hybrid symbol structure, and the hybrid symbol structure corresponds to one or more of a presence or absence of the header portion, a presence or absence of the tail portion, a length of the header portion, a length of the tail portion, a type of the header portion, or a type of the tail portion.

Aspect 7 is the apparatus of aspect 6, where the indication of the hybrid symbol structure is received from the base station via an RRC message, a MAC-CE, or a DCI message.

Aspect 8 is the apparatus of any of aspects 6 and 7, where the hybrid symbol structure is associated with at least one of a single UE, a set of UEs, a single beam, a single TCI state, a set of beams, a single sub-band, a set of sub-bands, a single UE antenna panel, a set of UE antenna panels, a single channel, or a set of channels.

Aspect 9 is the apparatus of any of aspects 6 to 8, where a second hybrid symbol is located in a same slot as the hybrid symbol, and the second hybrid symbol is associated with a second hybrid symbol structure different from the hybrid symbol structure.

Aspect 10 is the apparatus of aspect 9, where a configuration of the slot is based on a slot configuration indication received from the base station or a predefined rule.

Aspect 11 is the apparatus of any of aspects 6 to 10, where the hybrid symbol structure is associated with a slot resolution or a sub-slot resolution.

Aspect 12 is the apparatus of any of aspects 6 to 11, where the indication of the hybrid symbol structure is associated with: all symbols after the indication, a predefined application pattern, or a preconfigured time period.

Aspect 13 is the apparatus of aspect 12, where application of the hybrid symbol structure is associated with a time delay from the indication of the hybrid symbol structure, and the time delay is based on at least one of a time delay indication received from the base station, a prespecification, or a UE capability.

Aspect 14 is the apparatus of any of aspects 6 to 13, the at least one processor being further configured to: transmit, to the base station, an indication of a recommended hybrid symbol structure, where the indication of the recommended hybrid symbol structure is transmitted based on a rule being met, the rule is based on an indication of the rule received from the base station or a prespecification, the indication of the recommended hybrid symbol structure is associated with a single UE antenna panel or a set of UE antenna panels, and the indication of the hybrid symbol structure is based on the indication of the recommended hybrid symbol structure.

Aspect 15 is the apparatus of any of aspects 1 to 14, further including a transceiver coupled to the at least one processor.

Aspect 16 is an apparatus for wireless communication at a base station including at least one processor coupled to a memory and configured to generate a hybrid symbol including a CP portion, a data portion, and at least one of a header portion or a tail portion, the CP portion being located at a beginning of the hybrid symbol and including one or more CP samples that correspond to a predefined number of samples at an end of the hybrid symbol, the data portion being located after the header portion or before the tail portion, the header portion being located after the CP portion and including one or more predefined header samples, and the tail portion being located at the end of the hybrid symbol and including one or more predefined tail samples; generate a waveform including the generated hybrid symbol; and transmit a signal based on the generated waveform.

Aspect 17 is the apparatus of aspect 16, where the waveform is one of an OFDM waveform, a DFT-s-OFDM waveform, or an SC waveform.

Aspect 18 is the apparatus of any of aspects 16 and 17, where the one or more predefined header samples include one or more zeroes or a predefined first sequence, and the one or more predefined tail samples include one or more zeroes or a predefined second sequence.

Aspect 19 is the apparatus of any of aspects 16 to 18, where the one or more CP samples include a same number of samples as the one or more predefined tail samples.

Aspect 20 is the apparatus of any of aspects 16 to 18, where the one or more CP samples include a different number of samples from the one or more predefined tail samples.

Aspect 21 is the apparatus of any of aspects 16 to 20, where the hybrid symbol is generated based on a hybrid symbol structure, the hybrid symbol structure corresponds to one or more of a presence or absence of the header portion, a presence or absence of the tail portion, a length of the header portion, a length of the tail portion, a type of the header portion, or a type of the tail portion.

Aspect 22 is the apparatus of aspect 21, where a second hybrid symbol is located in a same slot as the hybrid symbol, and the second hybrid symbol is associated with a second hybrid symbol structure different from the hybrid symbol structure.

Aspect 23 is the apparatus of aspect 22, where a configuration of the slot is based on a predefined rule.

Aspect 24 is the apparatus of any of aspects 16 to 23, the at least one processor being further configured to: transmit, to a UE, an indication of a first hybrid symbol structure associated with the UE, where the indication of the first hybrid symbol structure is transmitted to the UE via an RRC message, a MAC-CE, or a DCI message, and the first hybrid symbol structure is associated with a first hybrid symbol at the UE.

Aspect 25 is the apparatus of aspect 24, where the first hybrid symbol structure is associated with at least one of a single UE, a set of UEs, a single beam, a single TCI state, a set of beams, a single sub-band, a set of sub-bands, a single UE antenna panel, a set of UE antenna panels, a single channel, or a set of channels.

Aspect 26 is the apparatus of any of aspects 24 and 25, where the first hybrid symbol structure is associated with a slot resolution or a sub-slot resolution.

Aspect 27 is the apparatus of any of aspects 24 to 26, where the indication of the first hybrid symbol structure is associated with: all symbols after the indication, a predefined application pattern, or a preconfigured time period.

Aspect 28 is the apparatus of aspect 27, where application at the UE of the first hybrid symbol structure is associated with a time delay from the indication of the first hybrid symbol structure, and the time delay is based on at least one of a time delay indication from the base station, a prespecification, or a UE capability.

Aspect 29 is the apparatus of any of aspects 24 to 28, the at least one processor being further configured to: receive, from the UE, an indication of a recommended hybrid symbol structure, where the indication of the recommended hybrid symbol structure is based on a rule being met, the rule is based on an indication of the rule from the base station or a prespecification, the indication of the recommended hybrid symbol structure is associated with a single UE antenna panel or a set of UE antenna panels, and the indication of the first hybrid symbol structure is based on the indication of the recommended hybrid symbol structure.

Aspect 30 is the apparatus of any of aspects 16 to 29, further including a transceiver coupled to the at least one processor.

Aspect 31 is a method of wireless communication for implementing any of aspects 1 to 30.

Aspect 32 is an apparatus for wireless communication including means for implementing any of aspects 1 to 30.

Aspect 33 is a computer-readable medium storing computer executable code, where the code when executed by a processor causes the processor to implement any of aspects 1 to 30.

What is claimed is:

1. An apparatus for wireless communication at a user equipment (UE), comprising:
memory; and
at least one processor coupled to the memory and configured to:
generate, based on a hybrid symbol structure, a hybrid symbol comprising a cyclic prefix (CP) portion, a data portion, and at least one of a header portion or a tail portion, the CP portion being located at a beginning of the hybrid symbol and comprising one or more CP samples that correspond to a predefined number of samples at an end of the hybrid symbol, the data portion being located after the header portion or before the tail portion, the header portion being located after the CP portion and comprising one or more predefined header samples, and the tail portion being located at the end of the hybrid symbol and comprising one or more predefined tail samples, wherein the hybrid symbol structure corresponds to one or more of a presence or absence of the header portion, a presence or absence of the tail portion, a length of the header portion, a length of the tail portion, a type of the header portion, or a type of the tail portion;
generate a waveform including the generated hybrid symbol; and
transmit a signal based on the generated waveform.

2. The apparatus of claim 1, wherein the waveform is one of an orthogonal frequency-division multiplexing (OFDM) waveform, a discrete Fourier transform spread OFDM (DFT-s-OFDM) waveform, or a single carrier (SC) waveform.

3. The apparatus of claim 1, wherein the one or more predefined header samples comprise one or more zeroes or a predefined first sequence, and the one or more predefined tail samples comprise one or more zeroes or a predefined second sequence.

4. The apparatus of claim 1, wherein the one or more CP samples comprise a same number of samples as the one or more predefined tail samples.

5. The apparatus of claim 1, wherein the one or more CP samples comprise a different number of samples from the one or more predefined tail samples.

6. The apparatus of claim 1, the at least one processor being further configured to:
receive, from a base station, an indication of a hybrid symbol structure.

7. The apparatus of claim 6, wherein to receive the indication of the hybrid symbol structure, the at least one processor is configured to receive the indication of the hybrid symbol structure from the base station via a radio resource control (RRC) message, a medium access control (MAC)—control element (CE) (MAC-CE), or a downlink control information (DCI) message.

8. The apparatus of claim 6, wherein the hybrid symbol structure is associated with at least one of a single UE, a set of UEs, a single beam, a single transmission configuration indicator (TCI) state, a set of beams, a single sub-band, a set of sub-bands, a single UE antenna panel, a set of UE antenna panels, a single channel, or a set of channels.

9. The apparatus of claim 6, wherein a same slot as the hybrid symbol also includes a second hybrid symbol, and the second hybrid symbol is associated with a second hybrid symbol structure different from the hybrid symbol structure.

10. The apparatus of claim 9, wherein the at least one processor is further configured to receive, from the base station, a slot configuration indication, wherein a configuration of the slot is based on the slot configuration indications: or
wherein the configuration of the slot is based on a predefined rule.

11. The apparatus of claim 6, wherein the hybrid symbol structure is associated with a slot resolution or a sub-slot resolution.

12. The apparatus of claim 6, wherein the indication of the hybrid symbol structure is associated with:
all symbols after the indication,
a predefined application pattern, or
a preconfigured time period.

13. The apparatus of claim 12, wherein application of the hybrid symbol structure is associated with a time delay from the indication of the hybrid symbol structure, and the time delay is based on at least one of a time delay indication received from the base station, a prespecification, or a UE capability.

14. The apparatus of claim 6, further comprising a transceiver coupled to the at least one processor, the at least one processor being further configured to:
receive, from the base station, an indication of a rule; and
transmit, to the base station based on the rule being met, an indication of a recommended hybrid symbol structure, wherein the rule is based on the indication of the rule or a prespecification, wherein the indication of the recommended hybrid symbol structure is associated with a single UE antenna panel or a set of UE antenna panels, and wherein the indication of the hybrid symbol structure is based on the indication of the recommended hybrid symbol structure.

15. A method of wireless communication at a user equipment (UE), comprising:
generating, based on a hybrid symbol structure, a hybrid symbol comprising a cyclic prefix (CP) portion, a data portion, and at least one of a header portion or a tail portion, the CP portion being located at a beginning of the hybrid symbol and comprising one or more CP samples that correspond to a predefined number of samples at an end of the hybrid symbol, the data portion being located after the header portion or before the tail portion, the header portion being located after the CP portion and comprising one or more predefined header samples, and the tail portion being located at the end of the hybrid symbol and comprising one or more predefined tail samples;
generating a waveform including the generated hybrid symbol, wherein the hybrid symbol structure corresponds to one or more of a presence or absence of the header portion, a presence or absence of the tail portion, a length of the header portion, a length of the tail portion, a type of the header portion, or a type of the tail portion; and
transmitting a signal based on the generated waveform.

16. An apparatus for wireless communication at a base station, comprising:
memory; and
at least one processor coupled to the memory and configured to:
generate, based on a hybrid symbol structure, a hybrid symbol comprising a cyclic prefix (CP) portion, a data portion, and at least one of a header portion or a tail portion, the CP portion being located at a beginning of the hybrid symbol and comprising one or more CP samples that correspond to a predefined number of samples at an end of the hybrid symbol, the data portion being located after the header portion or before the tail portion, the header portion being located after the CP portion and comprising one or more predefined header samples, and the tail portion being located at the end of the hybrid symbol and comprising one or more predefined tail samples, wherein the hybrid symbol structure corresponds to one or more of a presence or absence of the header portion, a presence or absence of the tail portion, a length of the header portion, a length of the tail portion, a type of the header portion, or a type of the tail portion;
generate a waveform including the generated hybrid symbol; and
transmit a signal based on the generated waveform.

17. The apparatus of claim 16, wherein the waveform is one of an orthogonal frequency-division multiplexing (OFDM) waveform, a discrete Fourier transform spread OFDM (DFT-s-OFDM) waveform, or a single carrier (SC) waveform.

18. The apparatus of claim 16, wherein the one or more predefined header samples comprise one or more zeroes or a predefined first sequence, and the one or more predefined tail samples comprise one or more zeroes or a predefined second sequence.

19. The apparatus of claim 16, wherein the one or more CP samples comprise a same number of samples as the one or more predefined tail samples.

20. The apparatus of claim 16, wherein the one or more CP samples comprise a different number of samples from the one or more predefined tail samples.

21. The apparatus of claim 16, wherein a same slot as the hybrid symbol also includes a second hybrid symbol, and the second hybrid symbol is associated with a second hybrid symbol structure different from the hybrid symbol structure.

22. The apparatus of claim 21, wherein a configuration of the slot is based on a predefined rule.

23. The apparatus of claim 16, the at least one processor being further configured to:
transmit, to a user equipment (UE), an indication of the hybrid symbol structure associated with the UE via a radio resource control (RRC) message, a medium access control (MAC)—control element (CE) (MAC-CE), or a downlink control information (DCI) message, and wherein the hybrid symbol structure is associated with a first hybrid symbol at the UE.

24. The apparatus of claim 23, wherein the first hybrid symbol structure is associated with at least one of a single UE, a set of UEs, a single beam, a single transmission configuration indicator (TCI) state, a set of beams, a single sub-band, a set of sub-bands, a single UE antenna panel, a set of UE antenna panels, a single channel, or a set of channels.

25. The apparatus of claim 23, wherein the first hybrid symbol structure is associated with a slot resolution or a sub-slot resolution.

26. The apparatus of claim 23, wherein the indication of the first hybrid symbol structure is associated with:
all symbols after the indication,
a predefined application pattern, or
a preconfigured time period.

27. The apparatus of claim 26, wherein application at the UE of the hybrid symbol structure is associated with a time delay from the indication of the first hybrid symbol structure, and the time delay is based on at least one of a time delay indication, a prespecification, or a UE capability.

28. The apparatus of claim 23, further comprising a transceiver coupled to the at least one processor, the at least one processor being further configured to:
transmit, to the UE, an indication of a rule; and
receive, from the UE based on the rule being met, an indication of a recommended hybrid symbol structure, wherein the rule is based on the indication of the rule or a prespecification, wherein the indication of the recommended hybrid symbol structure is associated with a single UE antenna panel or a set of UE antenna panels, and wherein the indication of the hybrid symbol structure is based on the indication of the recommended hybrid symbol structure.

29. A method of wireless communication at a base station, comprising:
generating, based on a hybrid symbol structure, a hybrid symbol comprising a cyclic prefix (CP) portion, a data portion, and at least one of a header portion or a tail portion, the CP portion being located at a beginning of the hybrid symbol and comprising one or more CP samples that correspond to a predefined number of samples at an end of the hybrid symbol, the data portion being located after the header portion or before the tail portion, the header portion being located after the CP portion and comprising one or more predefined header samples, and the tail portion being located at the end of the hybrid symbol and comprising one or more predefined tail samples, wherein the hybrid symbol structure corresponds to one or more of a presence or absence of the header portion, a presence or absence of the tail portion, a length of the header portion, a length of the tail portion, a type of the header portion, or a type of the tail portion;
generating a waveform including the generated hybrid symbol; and
transmitting a signal based on the generated waveform.

* * * * *